US006764531B2

(12) United States Patent
Hogan

(10) Patent No.: US 6,764,531 B2
(45) Date of Patent: Jul. 20, 2004

(54) METHOD AND APPARATUS FOR CLEANING A GAS

(76) Inventor: J. S. Hogan, 1742 Country Club Dr., Sugar Land, TX (US) 77478-3906

( * ) Notice: Subject to any disclaimer, the term of this patent is extended or adjusted under 35 U.S.C. 154(b) by 100 days.

(21) Appl. No.: 10/229,853

(22) Filed: Aug. 28, 2002

(65) Prior Publication Data

US 2003/0005825 A1 Jan. 9, 2003

Related U.S. Application Data

(63) Continuation-in-part of application No. 10/085,830, filed on Feb. 28, 2002, now Pat. No. 6,485,548, which is a continuation-in-part of application No. 09/900,828, filed on Jul. 6, 2001, now Pat. No. 6,391,100.

(51) Int. Cl.$^7$ .............................................. B01D 47/16
(52) U.S. Cl. ............................. 95/218; 96/282; 96/284
(58) Field of Search ....................... 95/216, 218, 222, 95/221; 96/267, 268, 269, 281, 282, 284

(56) References Cited

U.S. PATENT DOCUMENTS

| 2,200,891 A | * | 5/1940 | Nyborg |
| 2,395,526 A | * | 3/1946 | Nilsson |
| 2,941,872 A | * | 6/1960 | Pilo et al. |
| 3,005,515 A | * | 10/1961 | Caddell |
| 3,149,935 A | * | 9/1964 | Jamison et al. |
| 3,321,191 A | * | 5/1967 | Najarian |
| 3,379,422 A | * | 4/1968 | Liesenhoff |
| 3,385,030 A | * | 5/1968 | Letvin |
| 3,448,562 A | * | 6/1969 | Wisting |
| 3,517,485 A | * | 6/1970 | Dell'Agnese et al. |
| 3,524,631 A | * | 8/1970 | Mare |
| 3,581,467 A | * | 6/1971 | Donnelly |
| 3,789,585 A | * | 2/1974 | Arnold et al. |
| 4,478,616 A | * | 10/1984 | Jarvenpaa |
| 4,514,194 A | * | 4/1985 | Jarvenpaa |
| 4,594,081 A | * | 6/1986 | Kroll et al. |
| 4,762,538 A | * | 8/1988 | Michler et al. |
| 4,874,400 A | * | 10/1989 | Jury |
| 5,076,819 A | * | 12/1991 | Sharrow |
| 6,042,636 A | * | 3/2000 | Aishima et al. |
| 6,391,100 B1 | * | 5/2002 | Hogan |
| 6,485,548 B1 | * | 11/2002 | Hogan |
| 2003/0005825 A1 | * | 1/2003 | Hogan |

FOREIGN PATENT DOCUMENTS

FR    1424981    * 2/1965

* cited by examiner

Primary Examiner—Duane S. Smith
(74) Attorney, Agent, or Firm—Winstead Sechrest Minick P.C.; Henry L. Ehrlich

(57) ABSTRACT

A system and method of cleaning a gas of undesired particulate, aromas, and gases of the type utilizing a centrifuge with various combinations and apparatus used to liquid wet a gas stream is provided. The gas scrubber of the present invention includes a container for containing a liquid having a surface forming a space between said surface and the container top; a motor having a rotatable vertically mounted shaft mounted above said top with said shaft connected to and rotatable with a centrifuge cylinder having an inlet positioned outside of said container and having an outlet positioned in said space. Said cylinder contains fan blades to draw gas from said cylinder inlet and out said cylinder outlet. A vertically mounted rotatable siphon pipe, connected to said shaft, that has an inlet positioned below said surface and an outlet positioned proximate said centrifuge inlet to draw liquid up and out to the centrifuge inlet and flow down the centrifuge wall to clean the wall and mix with said gas. A throat may be provided at said cylinder outlet to further mix said gas. A moving liquid surface may also be provided in front of said throat outlet to allow the departing gas from said throat to impact and additionally mix said gas.

141 Claims, 10 Drawing Sheets

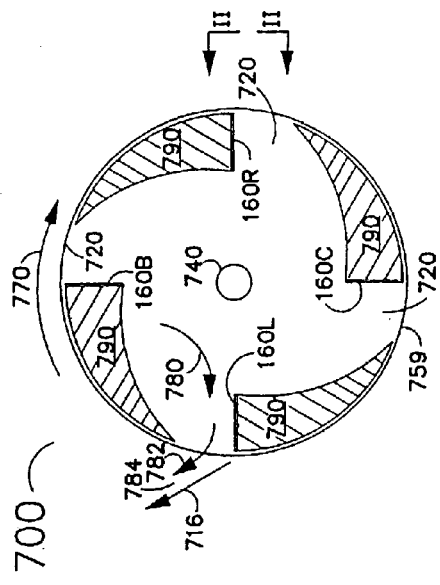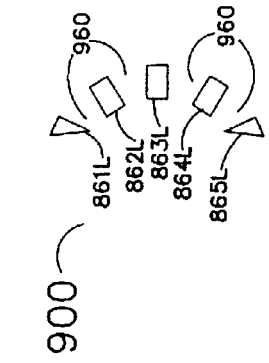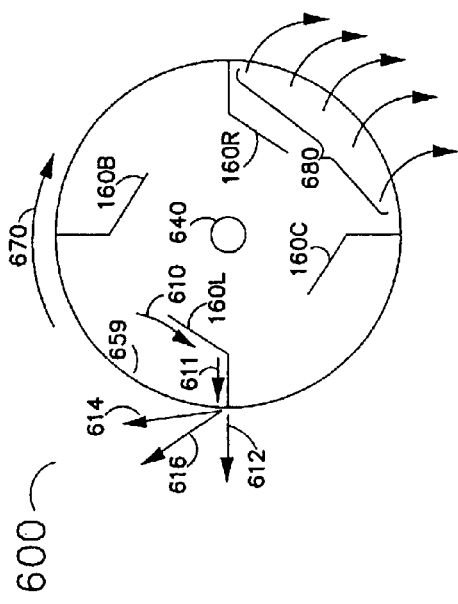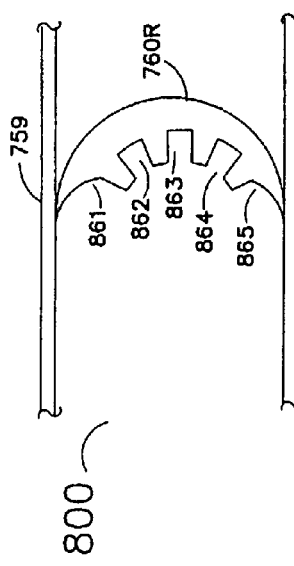
FIG 7
FIG 9
FIG 6
FIG 8

METHOD AND APPARATUS FOR CLEANING A GAS

RELATED APPLICATIONS

This application is a continuation-in-part of and claims benefit of priority of U.S. patent applications Ser. No. 10/085,830, filed Feb. 28, 2002 now U.S. Pat. No. 6,485,548B1, entitled Method and Apparatus for Cleaning Gas that is a continuation of Ser. No. 09/900,828, filed Jul. 6, 2001, entitled Method and Apparatus for Cleaning Gas issued May 21, 2002 as U.S. Pat. No. 6,391,100 B, both incorporated by reference herein.

TECHNICAL FIELD

The present invention relates generally to the field of cleaning a gas stream and more particularly to a method and apparatus for removing particulates and absorbing selected gases from a gas stream by mixing a gas with a liquid to wet the particulates and absorb the selected gases to discharge a cleaned gas in an economical manner.

BACKGROUND INFORMATION

It is very often desirable to clean a gas stream of particulates and/or undesirable gases. It is sometimes desirable to remove particulates or selective gases for capture or disposal from a gas stream by absorption or mixing with a liquid. It is also becoming more desirable and popular to clean air in domestic settings, particularly the removal of spores, bacteria, and viruses due to the current biological threats by terrorists. Other domestic pollutants include, but not limited to, allergens such as pollen, mites, pet dandruff, hair and dead skin and dust, and gases such as carbon dioxide, carbon monoxide, and other auto emissions.

Several methods are currently used to clean or partially clean gases such as air in a domestic setting. Some of the most common methods of "cleaning air" are the utilization of filter systems, electrostatic devices, and venturi scrubbers. Filter systems require frequent cleaning and electrostatic devices and venturi scrubbers are limited in the quantity of gas being processed economically.

Viruses, bacteria, spores, small particulate and some small insects such as some small baby spiders, often float in air currents and even circle the earth. It is said that such minute living beings can travel to outer space and live for over one thousand years, even though exposed to extreme temperatures and radiation. It is therefore not reasonable to assume that the gravitational force of only one gravity can totally and efficiently remove such minute beings and particulate from the domestic air that we breathe. Yet, it is very easy to provide a centrifuge that can produce a gravitational force of thousands of gravities.

It is a desire to provide an improved method and apparatus for removing particulates and selected gases from a gas stream by flowing the stream through a centrifuge. It is a further desire to convey a stream of gas and liquid through a specially designed venturi throat at a high velocity and impact it with the surface of an economically produced stream of flowing liquid. It is a still further desire to provide a centrifuge that can continually centrifugally remove small particulate from a gas and has an economical method for continually removing such particulate that collects on the inside centrifuge wall.

SUMMARY

A system and method of cleansing a gas of undesired particulate, aromas, and gases of the type utilizing a liquid to wet the particulate and absorb selected gases from a gas stream is provided. A centrifuge cylinder is used and a liquid stream is provided to remove the centrifuged particulates from the inside wall of the centrifuge cylinder. The gas scrubber of the present invention including a container having a bottom wall and a top wall, interconnected by a side wall for containing a liquid therein having a surface positioned below the top wall that provides a space between the surface and the top wall. The top wall is provided with an opening, and a rotatable shaft is vertically mounted above the top wall and down through the midsection of the opening and down through the midsection of a rotatable vertically mounted siphon pipe that is positioned inside of a rotatable vertically mounted centrifuge cylinder. The siphon pipe and the cylinder are attached to the shaft so that the pipe and cylinder are rotated by the shaft. The cylinder top inlet opening is positioned proximate the top wall inlet opening and the cylinder bottom outlet opening, larger than the cylinder inlet opening, is positioned proximate the upper portion of a venturi throat that is connected to the cylinder outlet. The siphon pipe bottom inlet opening is positioned below the liquid surface to allow the liquid to flow to the inside of the siphon pipe and to rotate therewith. The siphon pipe top outlet opening is larger than the bottom inlet opening and is positioned proximate the cylinder inlet opening so that liquid flowing from the siphon pipe flows to the cylinder and out the cylinder outlet. Fan blades are positioned in the cylinder to draw gas from the outside of the container and through the cylinder.

In operation, the rotating liquid inside the siphon pipe is centrifugally forced up and out the siphon pipe outlet and to the blade walls and the inside wall of the cylinder. Liquid flows down the blade and cylinder walls, out the cylinder outlet, and through the venturi throat at a high velocity. Gas is drawn from the cylinder inlet, by the rotating fan blades, and flows out the cylinder outlet and through said throat with said liquid. The gas, and particulates in the gas, is mixed with the liquid as it comes in contact with the liquid flowing down the walls of the blade and the inside of the cylinder. Heavier particulates in the gas are centrifugally forced to the inside cylinder wall and liquid wetted when coming in contact with the flowing liquid. The particulates and selected gases in the incoming gas stream are additionally wetted and absorbed in the high velocity liquid stream as they flow together through the channel throat to the space.

The apparatus is provided with a way to allow the scrubbed gas to flow out of the container with entrained liquid in the scrubbed gas to be centrifugally removed and a way to replace liquid removed by the operation.

The apparatus is also provided with a way to cause said liquid surface to slope upward in the area of the throat outlet and cause the stream of high velocity liquid and gas mixture to come in contact and impinge on said liquid surface. This further liquid wets the particulates and provides a quieter operation.

Alternate forms of the apparatus are taught including an apparatus having an additional siphon pipe to flow liquid to the bottom of the cylinder, as well as the top, an apparatus having only one siphon pipe at the bottom, and an apparatus having no siphon pipe. Also different forms of the channel and throat are shown.

The main advantages of the present invention include an apparatus and method for cleaning a gas stream by wetting it with a liquid by utilizing a combination of forces including: impacting the surface of a flowing liquid stream with the stream of gas to be cleaned; centrifugally subjecting the gas stream to a very high gravitational force to cause heavier particulates and molecules to gravitate out and mix with a flowing liquid stream; flowing the mixture of gas and liquid at a high velocity through a restricted throat thereby causing a venturi scrubbing of the gas stream; and forcing the mixture stream out of the throat to contact and impinge the liquid surface and have a portion of the stream to submerge beneath the liquid surface to further wet the particulates and gas.

The foregoing has outlined rather broadly the features and technical advantages of the present invention in order that the detailed description of preferred embodiments of the invention that follows can be better understood. Additional features and advantages of the invention which form the subject of the claims of the invention will be described hereinafter.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a schematic plan view along the section line I—I of FIG. 5.

FIG. 7 is an alternate schematic plan view along the section line I—I of FIG. 5.

FIG. 8 is a schematic elevation view along the section line II—II of FIG. 7 showing the grooves in the external end of the fan blade.

FIG. 9 is a schematic elevation view of the liquid streams flowing out of the grooves of FIG. 8.

DETAILED DESCRIPTION

Figure 1:
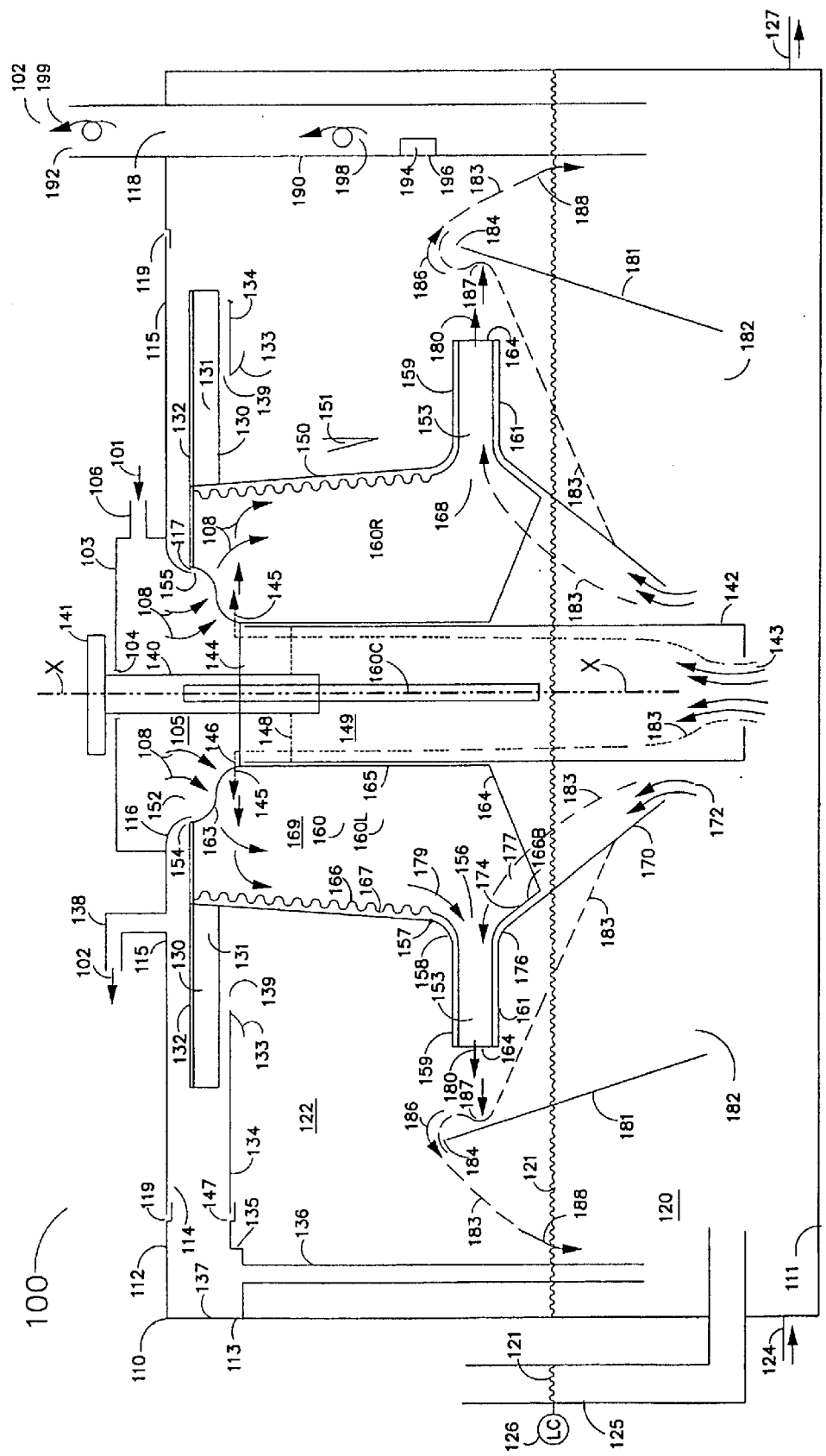
FIG. 1 is a schematic view of a gas scrubber of the present invention.

Refer now to the drawings wherein depicted elements are not necessarily shown to scale and wherein like or similar elements are designated by similar reference numerals through the several figures.

FIGS. 12, 13, 14, and 15 are side views of some of the different fan blade configurations that may be utilized for fan blades described in relation to the additional Figures.

Figure 12:
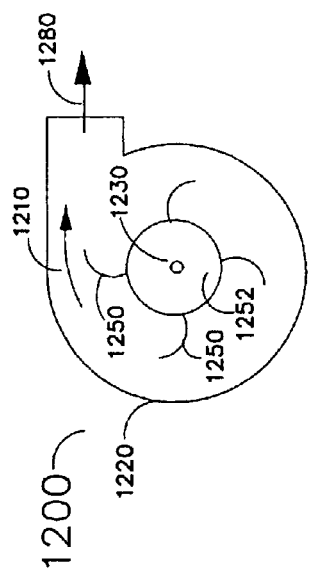
FIG. 12 is a schematic side view of a fan having "forward curved" fan blades.

FIG. 12 is a side view of a fan using impellers hereinafter referred to as "forward curved fan blades". In FIG. 12, fan 1200, having housing 1220, has a shaft 1230 that is rotating forward curved fan blades 1250 in a direction of rotation 1210 to draw gas through inlet opening 1252 and discharge the gas out the outlet opening 1280 as shown by the arrow. Note that the blades 1250 are "curved forward" in the direction of rotation.

Figure 13:
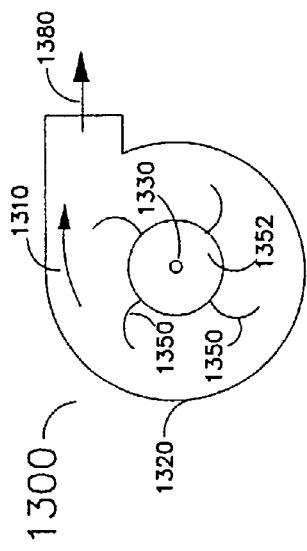
FIG. 13 is a schematic side view of a fan having "backward inclined" fan blades.

FIG. 13 is a side view of a fan using impellers hereinafter referred to as "backward inclined fan blades". In FIG. 13, fan 1300, having housing 1320, has a shaft 1330 that is rotating backward inclined fan blades 1350 in a direction of rotation 1310 to draw gas through inlet opening 1352 and discharge the gas out the outlet opening 1380 as shown by the arrow. Note that the blades 1350 are "inclined backward" from the direction of rotation.

Figure 14:
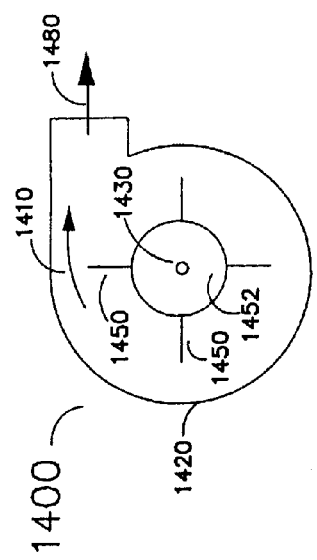
FIG. 14 is a schematic side view of a fan having "radial" fan blades.

FIG. 14 is a side view of a fan using impellers hereinafter referred to as "radial blades". In FIG. 14, fan 1400, having housing 1420, has a shaft 1430 that is rotating radial fan blades 1450 in a direction of rotation 1410 to draw gas through inlet opening 1452 and discharge the gas out the outlet opening 1480 as shown by the arrow. Note that the blades 1450 are "radial" to the fan shaft.

Figure 15:
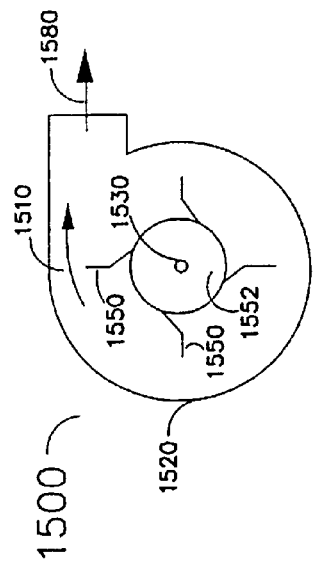
FIG. 15 is a schematic side view of a fan having "radial tip" fan blades.

FIG. 15 is a side view of a fan using impellers hereinafter referred to as "radial tip fan blades". In FIG. 15, fan 1500, having housing 1520, has a shaft 1530 that is rotating radial tip fan blades 1550 in a direction of rotation 1510 to draw gas through inlet opening 1552 and discharge the gas out the outlet opening 1580 as shown by arrow. Note that the blades 1550 are "radial" to the fan shaft at the outer extremity of the impeller, but backward from the direction of rotation at the inside portion of the impeller.

FIG. 1 is a schematic view of a gas scrubber, generally denoted by the numeral 100. Scrubber 100 includes container 110 having a bottom wall 111, a top wall 112, interconnected by a side wall 113 for holding a liquid 120 having a surface 121 and providing a space 122 between surface 121 and top wall 112. Top wall 112 is provided with circular opening 114.

Container 110 is provided with level control means 126 to maintain surface 121 at a selected level. Level control 126 is connected to pipe 125 to accurately determine a quiescent liquid level 121. When scrubber 100 is in use, liquid 120 is consumed, so a method must be provided to selectively add liquid to maintain a selected level. There are many ways, known by those skilled in the art, to determine a quiescent liquid level and to apply level control means 126 to container 110, so level control 126 and pipe 125 is not explained in detail. Pipe 124 is connected to a supply of replacement liquid to add liquid as controlled by controller 126. Pipe 127 is used to selectively remove dirty liquid.

Opening 114 is covered by removable cover 115. Cover 115 is attached to top wall 112 by latch 119. The purpose of latch 119 is to secure cover 115 and to provide a seal that restricts a flow of gas from space 122 to the outside of the container. Cover 115 is provided with inlet cone 116 that provides an inlet opening 152 to the apparatus.

Inlet cone 116 is enclosed by circular housing 103 having inlet pipe 106 and shaft seal 104 so that gas to be scrubbed 101 flows in to the housing and in to the inlet cone as shown by 108.

Rotatable drive shaft 140 is vertically mounted through the midsection of circular inlet cone 116 and is adapted for rotation about vertically disposed axis X. Shaft 140 is connected to driving means 141 positioned above wall 112. Mountings and bearings for shaft 140 and driving means 141 are not shown, it being understood that such can be provided easily by one skilled in the art. Driving means 141 can be an electric motor, a combustion engine, or even a pulley or gear wheel that is connected to other rotating wheels, it being necessary only to suitably mount shaft 140 and to provide shaft 140 with means to rotate it in a selected direction of rotation and at a selected rate of rotation.

Rotatable inside siphon pipe 142 is vertically mounted and connected to shaft 140 by spokes 148 so that pipe 142 rotates with shaft 140. Siphon pipe 142 is vertically mounted between cylinder 150 and shaft 140 to allow a space 169 between the outside of siphon pipe 142 and the inside of cylinder 150. Siphon pipe 142 has outlet opening 144, as shown, and has inlet opening 143 positioned below surface 121 to allow liquid 120 to flow inside of siphon pipe 142 and to rotate therewith. The inlet opening 143 is slightly smaller than the outlet opening 144 of siphon pipe 142 to allow the rotating liquid inside of siphon pipe 142 to be forced, by centrifugal force, up the inside wall of siphon pipe 142 and over the rim 146 of siphon pipe 142.

The inside edges 165 of radial fan blades 160 are connected to the outside of siphon pipe 142 to rotate therewith, as shown. Scrubber 100 is provided with four fan blades 160. Blade 160L is shown on the left, blade 160C is shown in the center, blade 160R is shown on the right, and blade 160B in the back is not shown in FIG. 1. Only four blades are used for scrubber 100 to simplify the drawing, however, it is understood, that in actual practice, any selected number of blades can be utilized.

Rotatable centrifuge cylinder 150 is vertically mounted and connected to the outside edges 166 of blades 160, and the inside edges 165 of blades 160 are connected to the outside of siphon pipe 142 so that cylinder 150 rotates with shaft 140. The outside edges 166 of blades 160 are provided with notches 167 to allow a minimum circular flow of liquid inside of cylinder 150. Cylinder 150 is freely positioned inside of opening 152 so that it can rotate inside opening 152. Cylinder 150 is provided with seal 154 positioned proximate the outlet opening of inlet cone 116 that has a minimum space to allow the free rotation of cylinder 150 yet minimize the backflow of gas from space 122 through seal 154. Centrifuge cylinder 150 has outlet opening 156 with outlet opening edge 157 to provide a passage for gas to flow through inlet cylinder opening 152, cylinder 150, outlet opening 156; and over outlet opening edge 157. Cone shaped ring 158 is attached to edge 157 and to wall 159, as shown, to form the upper portion of channel 153 and throat 164.

Outside siphon pipe 170, is positioned outside inside siphon pipe 142 and is attached to the bottom outside edges 166B of blades 160 to rotate therewith. Pipe 170 has inlet opening 172 that is submerged below surface 121, to allow liquid 120 to flow inside of Pipe 170 and to rotate therewith. Outside siphon pipe 170 has outlet opening 174 that is larger than inlet opening 172. Outlet opening 174 is attached to cone shaped ring 176, and to bottom wall 161 which is attached to form the lower portion of channel 153 and throat 164.

Cone 181 is provided inside of container 110 and centered around the outside of throat 164. Cone 181 has inlet end 182 that is submerged below surface 121 and outlet end 184, which is larger than inlet end 182, is positioned above surface 121. Supports for cone 181 are not shown, it being assumed that such can be easily provided by one skilled in the art. The liquid 120, in the area of siphon pipe 170, is caused to rotate by friction of the rotating siphon pipe and is forced by centrifugal force up the slope of cone 181, as shown by surface 183, and over the outlet end 184 of cone 181 as shown by arrow 186. Such rotating liquid continues on and is pulled by gravity until it is submerged beneath surface 121, as shown by arrow 188.

Exhaust fan 130 has radial fan blades 131 that are circumferentially spaced around the upper portion of cylinder 150 and attached to cylinder 150 to rotate therewith. Circular partition 132 serves as a partition back plate for blades 131. Circular partition 134, which serves as a bottom housing for blades 131, is attached to inlet cone 133 that provides inlet opening 139 that allows gas to flow in to the suction side of blades 131. Circular ring sump 135 is attached to partition 134 and wall 113 to provide a sump to collect liquid droplets that impinge and coalesce on face 137 and gravitate down to sump 135 and drain pipe 136 to liquid 120. Outlet pipe 138 is attached to cover 115 to provide an outlet for processed gas 102 to flow from the inside of container 110.

Circular partition 134 is only partially shown on the right hand side of the drawing and ring sump 135 is not shown on the right hand side of FIG. 1. This is to clarify the drawing in showing cyclone pipe 190 which is an alternate method of demisting the gas before discharging it out of container 110. In other words, mist can be removed from the scrubbed gas in numerous ways, including the exhaust fan 130 method described above or the cyclone pipe 190 method described below.

In an alternate method of removing mist from the scrubbed gas, top wall 112 is provided with opening 118 having cyclone pipe 190 positioned there through. Cyclone pipe 190 has outlet opening 192 positioned outside of container 110 and inlet opening 194 positioned in space 122 and provided with partition 196 to force the gas from space 122 to flow tangentially into inlet opening 194 so that it spirals as it flows through cyclone pipe 190, as shown by arrow 198. The spiraling of the gas through cyclone pipe 190 centrifugally causes entrained water droplets to coalesce on the inside wall of cyclone 190 and to gravitate back down to surface 121.

The operation of scrubber 100 is summarized as follows. Container 110 contains liquid 120 and surface 121 is maintained by level control means 126. Motor 141 rotates shaft 140 and centrifuge cylinder 150, inside siphon pipe 140, radial blades 160, exhaust fan 130, and outside siphon pipe 170. The top of channel 153 is formed by wall 159, which is attached to centrifuge cylinder 150 by cone 158, and the bottom of channel 153 is formed by wall 161, which is an extension of outside siphon pipe 170. Channel 153 is a passageway to allow the flow of gas and liquid from space 169 to space 122. The inlet to channel 163 is centrifuge cylinder outlet opening 156, and the outlet of channel 153 is throat 164.

Gas 101 is drawn from the exterior of container 112 through pipe 106 and opening 152 by rotating blades 160 and flows down the inside of cylinder 150 and out the outlet end 156 and through channel 153 and throat 164 to space 122. Larger particulates and molecules in the gas are centrifugally forced to the inside wall of centrifugal cylinder 150 as the gas flows through cylinder 150 between blades 160.

Liquid 120 flows from submerged inlet 143 to the inside of rotating siphon pipe 142. The liquid inside siphon pipe 142 rotates therewith and is centrifugally forced up and out the larger end 144 of siphon 142. Particulates and larger molecules that are centrifugally forced to the inside wall of cylinder 150 mixes with liquid flowing down the wall. Some circulation and equalization of the liquid on the wall of cylinder 150 is allowed by notches 167 in blades 160. The liquid further mixes with the gas and cleans the faces of blades 160 and the inside wall of cylinder 150 as it flows down their surfaces. The liquid then flows out the outlet edges of cylinder 150 and through channel 153 and throat 164. As the high velocity liquid stream flows through channel 153 and throat 164, it helps draw the gas through the throat and it further mixes with the gas.

The inlet of the upper portion of channel 153 is formed by the cone shaped ring 158 and attached to the lower edge 157 of cylinder 150, and the inlet of the lower portion of channel 153 is formed by wall 161 attached to the cone shaped ring 176 which is attached to the outlet of outside siphon pipe 170. Liquid flows through inlet 172 of outside siphon pipe 170 and rotates with siphon pipe 170 and is centrifugally forced up and through channel 153 and throat 164. This high velocity stream of liquid combines with the liquid stream from cylinder 150 and helps draw and mix the gas flowing through channel 153 and throat 164.

The liquid next to the submerged portions of siphon pipes 170 and 142 rotates with the rotating siphon pipes and rotates up cone 181, as shown by rotating surface 183. The liquid and gas mixture stream 180 departing channel 153 and throat 164 then impacts surface 183 and mixes the gas and liquid further. The high velocity mixture stream of gas and liquid forces surface 183 against cone 181 as shown at 187. Some of the combined stream is then carried by the stream of arrow 186 and is submerged beneath surface 121 and mixes some of the gas and liquid still further, as shown by 188.

Gas flows from space 122 to the exhaust fan inlet 139 and exhaust fan blades 131 draw the gas and slings any liquid droplets against inside face 137 of wall 113 where they coalesce and gravitate down to liquid sump ring 135 and through pipe 136 to liquid surface 121. The pressurized processed gas 102 then flows out of the container by pipe 138.

The above is one method of removing mist and entrained liquid droplets from the processed gas. However, the following alternate method of removing such entrained liquid may be preferred:

Gas flows from space 122 tangentially to the inside of cyclone pipe 190 through opening 194 and spirals through cyclone pipe 190 as shown by arrow 198, and out outlet opening 192. Free liquid droplets coalesce on the inside wall of cyclone 190 and gravitate back down to liquid surface 121. Scrubbed gas 102 flows out outlet 192 as shown by arrow 199.

Accordingly, gas is scrubbed by mixing a stream of gas with a liquid stream as it flows down the face of the fan blades; scrubbing the stream of gas by flowing it through a venturi throat with a high velocity stream of liquid; Further mixing the gas by impacting the high velocity mixture of gas and liquid with a liquid surface after leaving the venturi throat; causing particulates and larger molecules in a stream of gas to be forced centrifugally to the inside wall of a centrifuge cylinder and mixed with a stream of liquid flowing on the face of the wall; and still further mixing at least some of the gas by submerging the mixture beneath a liquid surface.

Figure 2:
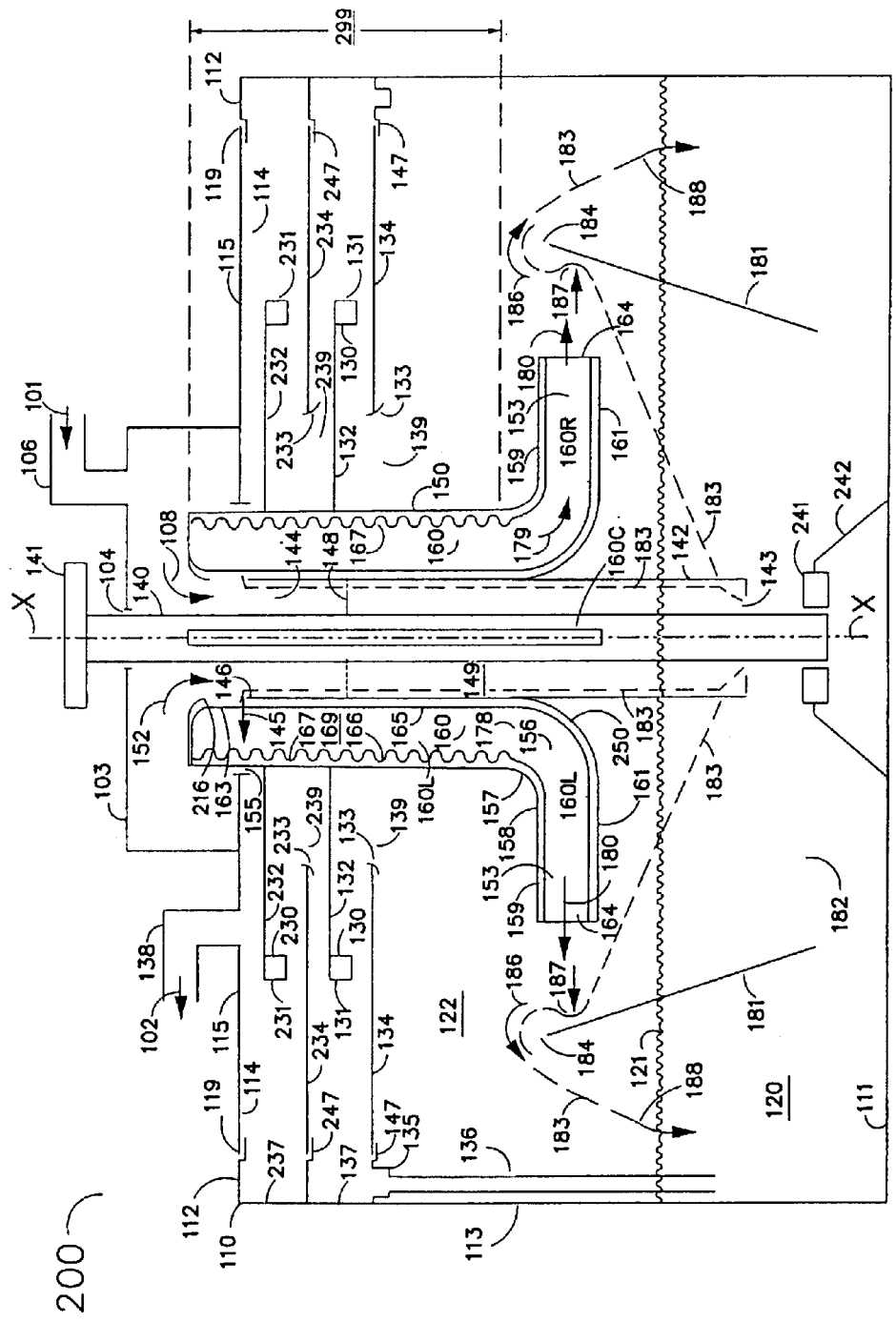
FIG. 2 is a schematic view of another embodiment of the gas scrubber of the present invention.

FIG. 2 is another embodiment of the present invention. All of the items numbered from 110 to 188 used in FIG. 2 are the same as those used in FIG. 1. Accordingly, please refer to the definitions and descriptions used in FIG. 1 for items numbered from 110 to 188.

The only items unique to the apparatus of FIG. 2, as compared to the apparatus of FIG. 1, are those items numbered from 200 to 299.

In FIG. 2, the centrifugal cylinder 150 is longer then the one of FIG. 1, as shown by dimension 299. This is to provide a longer time period for the particulates to be centrifugally separated from the gas. This longer cylinder is provided by extending cylinder 150 outside of cover 115 and attaching inlet cone 216 to the cylinder to rotate therewith. Also, bottom wall 250 is provided and the outside siphon pipe 170 of scrubber 100 has been omitted on scrubber 200.

Stabilizing bushing or bearing 241 is provided to support and stabilize the longer shaft 140. Support 242 is attached to bushing 241 and the container to support bushing 241.

The scrubber 200 of FIG. 2 is also provided with a second phase exhaust fan 230 having blades 231 that are attached to back plate 232 that is attached to cylinder 150 to rotate therewith. Bottom housing 234 is held by latch 247 and is provided with inlet cone 233 that provides second stage exhaust fan inlet 239.

The operation of scrubber 200 is summarized as follows. Container 110 contains liquid 120 and surface 121 is maintained by a level control means, not shown, similar to the one used on scrubber 100. Shaft 140 is rotated by motor 141 and centrifuge cylinder 150, siphon pipe 142, radial blades 160, first and second stage exhaust fans 130 and 230, and the upper and lower portions of channel 153, all rotate therewith. Gas 101 is drawn from the exterior of container 112 through pipe 106 and opening 152 by rotating blades 160 and flows down the inside of cylinder 150 and out the outlet end 156 and through channel 153 and throat 164 to space 122. Larger particulates and molecules in the gas are centrifugally forced to the inside wall of centrifugal cylinder 150 as the gas flows through cylinder 150 between blades 160. Liquid 120 flows from submerged inlet 143 to the inside of rotating siphon pipe 142. The liquid inside of siphon pipe 142 rotates therewith and is centrifugally forced up and out the larger end 144 and over rim 146, as shown by arrow 145, of siphon 142. Particulates and larger molecules that are centrifugally forced to the inside wall of cylinder 150 mixes with liquid flowing down the wall. Some circulation and equalization of the liquid on the wall of cylinder 150 is allowed by notches 167 in blades 160. The liquid further mixes with the gas and cleans the faces of blades 160 and the inside wall of cylinder 150 as it flows down their surfaces. The liquid then flows out the outlet rim 157 of cylinder 150 and through channel 153. As the high velocity liquid stream flows through channel 163 and throat 164, it helps draw the gas through the throat and it further mixes with the gas.

The upper portion of channel 153 is formed by wall 159 and cone shaped ring 158 which, in turn, is attached to the lower rim 157 of cylinder 150, and the lower portion of channel 153 is formed by wall 161 which is attached to siphon pipe 170. The outlet of channel 153 is throat 164.

The submerged portion of rotating siphon 142 rotates the adjacent liquid 120 and such rotating liquid rotates up cone 181 and assumes the new surface 183 which rotates over the top 184 of cone 181. After the high velocity liquid and gas mixture stream departs throat 164, it impacts stream 183 and mixes the gas and liquid further. The high velocity mixture stream of gas and liquid forces stream 183 against cone 181 as shown at 187. Some of the combined stream is then carried by the stream of arrow 186 and is submerged beneath surface 121 and mixes some of the gas and liquid still further, as shown by 188.

Gas flows from space 122 over inlet cone 133 to the exhaust fan inlet 139 and exhaust fan blades 131 draws the gas and slings any liquid droplets against wall 137 where they coalesce and gravitate down to liquid sump ring 135 and through down corner pipe 136 to liquid surface 121. The pressurized processed gas then flows over second stage inlet cone 233 to the second stage inlet 239 and the second stage exhaust fan blades 231 draws the gas and sling remaining entrained liquid droplets against wall 237 where they coalesce and gravitate to a second liquid sump, not shown, and through a second down corner pipe, also not shown, to liquid surface 121. The pressurized processed gas 102 then flows out of the container through pipe 138.

Figure 3:
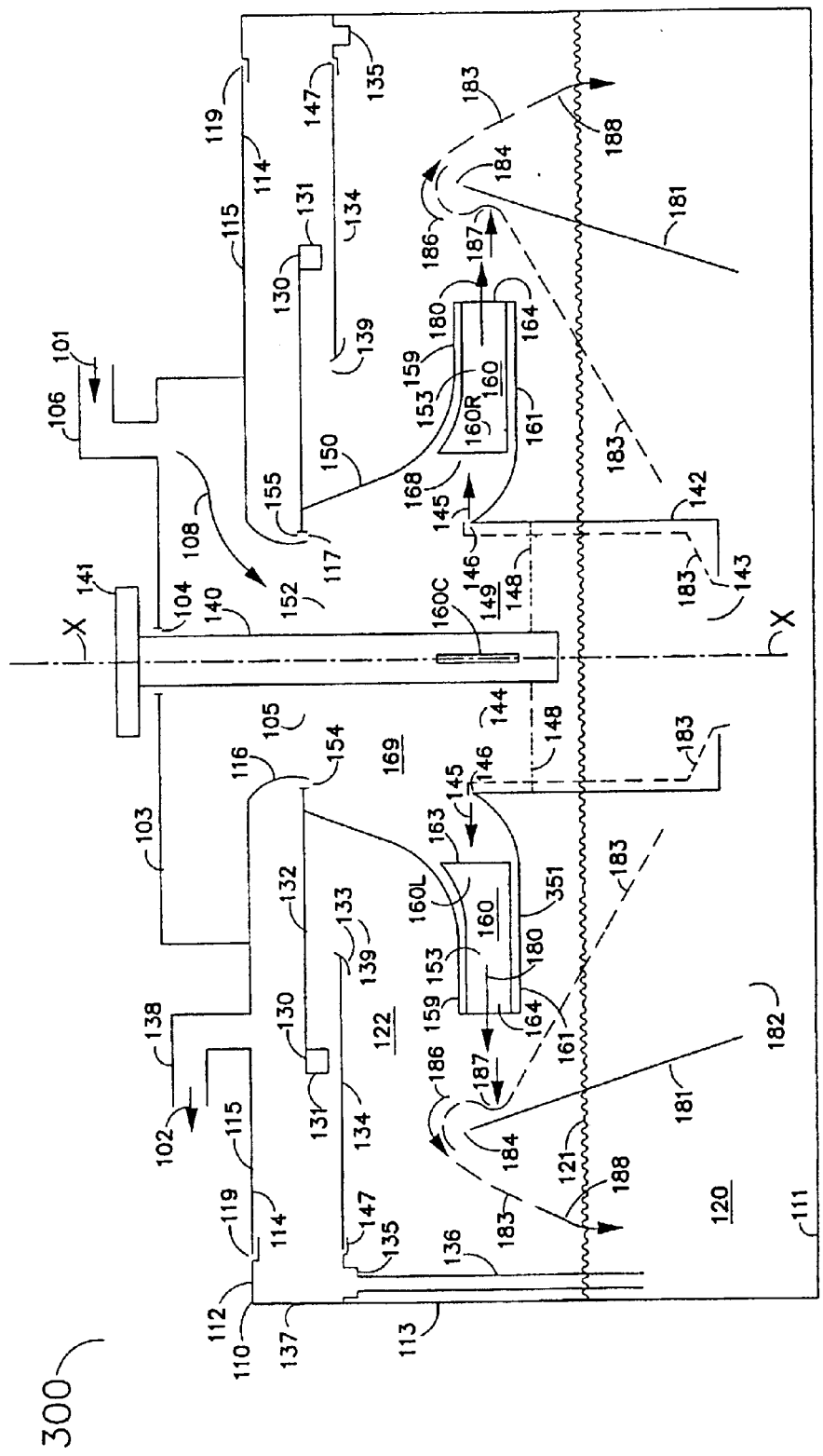
FIG. 3 is a schematic view of another embodiment of the gas scrubber of the present invention.

FIG. 3 is another embodiment of the present invention. All of the items numbers, except numbers 300" and 351, used in FIG. 3 are the same as those used in FIG. 1. Accordingly, please refer to the definitions and descriptions used in FIG. 1 for all the remaining items in FIG. 3.

The only items unique to the apparatus of FIG. 3, as compared to the apparatus of FIG. 1, are those items numbered 300 and 351. The apparatus of FIG. 3 is referred to as scrubber 300. Element 150 is the upper cylinder housing which is attached to wall 159 to form the upper side of channel 153 and 351 is the lower cylinder housing attached to the siphon pipe to form the lower side of channel 153.

In FIG. 3, the upper cylinder housing 150 is shorter than centrifuge cylinder 150 of FIG. 1, and housing 150 is not used as a centrifuge housing. This is to provide a more economical apparatus, although less efficient in some cases. Also, bottom cone shaped wall 351 is attached to wall 161 and siphon pipe 142 so that the liquid drawn up by siphon pipe 142 flows directly to the fan blades. Scrubber 300 of FIG. 3 uses only one siphon pipe.

The operation of scrubber 300 is summarized as follows. Container 110 contains liquid 120 and surface 121 is maintained by a level control means, not shown, similar to the one used on scrubber 100. Shaft 140 is rotated by motor 141, cylinder 150, siphon pipe 142, fan blades 160, exhaust fan back plate 132, with blades 131, and the upper and lower portion 159 and 351 of channel 153 and throat 164, all rotate with shaft 140. Gas is drawn through opening 152 by rotating blades 160 and flows down the inside of housing 150 and through channel 153 and throat 164 to space 122. Liquid 120 flows from submerged inlet 143 to the inside of rotating siphon pipe 142. The liquid inside of siphon pipe 142 rotates therewith and is centrifugally forced up and out the larger end 144 and over the outlet rim 146 of siphon 142. The liquid then flows through channel 153 and throat 164. Larger particulate and molecules in the gas are wetted and absorbed by the liquid as the mixture flows through channel 153 and throat 164. As the high velocity liquid stream flows through channel 153 and throat 164, it helps draw the gas through the throat and further mixes it with the gas.

The submerged portion of rotating siphon 142 rotates the adjacent liquid 120 and such rotating liquid rotates up cone 181 and assumes the new surface 183 which rotates over the top 184 of cone 181. After the high velocity liquid and gas mixture stream departs throat 164, it impacts surface 183 and mixes the gas and liquid further. The high velocity mixture stream of gas and liquid forces surface 183 against cone 181 as shown at 187. Some of the combined stream is then carried by the stream of arrow 186 and is submerged beneath surface 121 and mixes some of the gas and liquid still further, as shown by 188.

Gas flows from space 122 over inlet cone 133 to the exhaust fan inlet 130 and exhaust fan blades 131 draws the gas and slings any liquid droplets against wall 137 where they coalesce and gravitate down to liquid sump ring 135 and through down corner pipe 136 to liquid surface 121. The pressurized processed gas 102 then flows out of the container through pipe 138.

Figure 4:
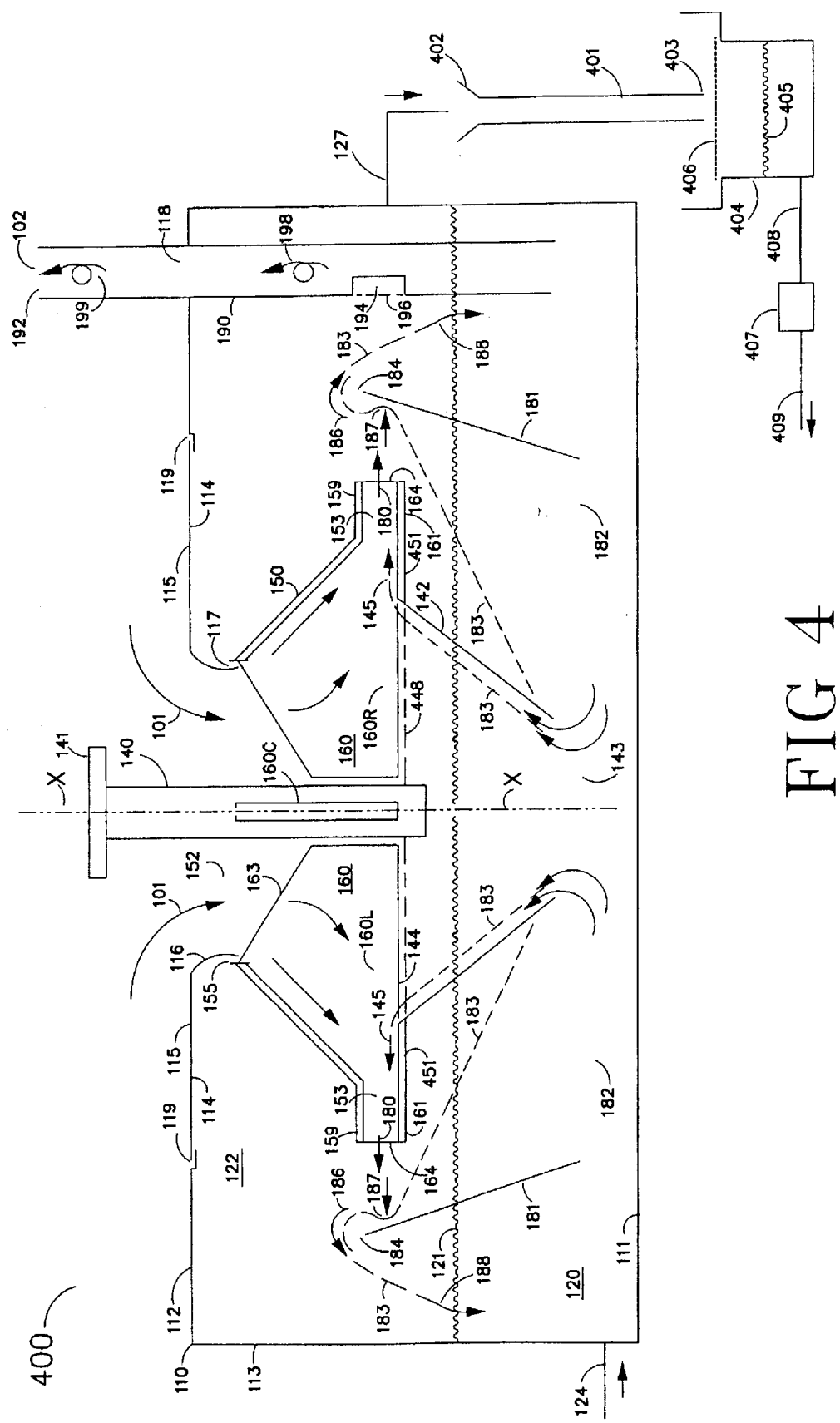
FIG. 4 is a schematic view of another embodiment of the gas scrubber of the present invention.

FIG. 4 is another embodiment of the present invention. All of the item numbers, except numbers 400–409 and 451, used in FIG. 4 are the same as those used in FIG. 1. Accordingly, please refer to the definitions and descriptions used in FIG. 1 for all the remaining items in FIG. 4.

The apparatus of FIG. 4 is referred to as scrubber 400. Upper cylinder housing 150 is attached to wall 159, which forms the upper side of channel 153. The lower side of channel 153 is formed by wall 161 which is attached to wall 451, which in turn, is attached to siphon pipe 142. Throat 164 is the outlet of channel 153.

In FIG. 4, the exhaust fan of FIG. 1 has been removed and replaced by the cyclone pipe 190. The inlet housing 103 of FIG. 1 has been removed for scrubber 400 of FIG. 4. Also, siphon pipe 142 is cone shaped and is attached directly to bottom channel wall 451. Outlet drain pipe 127 is located at a selected level position that is desired to maintain surface 183 at a selected level. Scrubber 400 is provided with reservoir container 404 for holding strainer 406 and a liquid with surface 405. Conduit 401 has inlet 402 positioned to receive overflow liquid from outlet pipe 127, and outlet 403 positioned to convey liquid to strainer 406. Pump 407 has inlet pipe 408 connected to container 404 and outlet pipe 409 connected to container 110 inlet 124 (connection not shown) for continuously conveying the overflow liquid from container 404 to container 110. Pump 407 may selectively be located on the outside of container 404 or submerged in the liquid of container 404.

The operation of scrubber 400 is summarized as follows. Container 110 contains liquid 120 and surface 121 is maintained by a level control means, not shown, similar to the one used on scrubber 100, or alternatively, by overflow drain pipe 127 and pump 407. Shaft 140 is rotated by motor 141 and cylinder 150, siphon pipe 142, fan blades 160, including the upper and lower portion 451 of channel 153, all rotate therewith. Gas is drawn through opening 152 by rotating blades 160 and flows down the inside of housing 150 and through channel 153 and throat 164 to space 122. Liquid 120 flows from submerged inlet 143 to the inside of rotating siphon pipe 142. The liquid inside of siphon pipe 142 rotates therewith and is centrifugally forced up and out the larger end 144 of siphon 142. The liquid then flows through channel 153 and throat 164. Larger particulate and molecules in the gas are wetted and absorbed by the liquid as the mixture flows through channel 153 and throat 164. As the high velocity liquid stream flows through channel 153 and throat 164, it helps draw the gas through the throat and it further mixes with the gas. Optionally, a selected level for surface 121, when scrubber 400 is in operation, is maintained by the level position of outlet pipe 127 and the liquid is continuously recirculated by pump 407 and continuously filtered by strainer 406.

The submerged portion of rotating siphon 142 rotates the adjacent liquid 120 and such rotating liquid rotates up cone 181 and becomes the new surface 183 which rotates over the top 184 of cone 181. After the high velocity liquid and gas mixture stream departs throat 164, it impacts stream 183 and mixes the gas and liquid further. The high velocity mixture stream of gas and liquid forces stream 183 against cone 181 as shown at 187. Some of the combined stream is then carried by the stream of arrow 186 and is submerged beneath surface 121 and mixes some of the gas and liquid still further, as shown by 188.

Gas flows from space 122 tangentially to the inside of cyclone pipe 190 through opening 194 and spirals through cyclone pipe 190 as shown by arrow 198, and out outlet opening 192. Free liquid droplets coalesce on the inside wall of cyclone 190 and gravitate back down to liquid surface 121. Scrubbed gas 102 flows out outlet 192 as shown by arrow 199.

Figure 5:
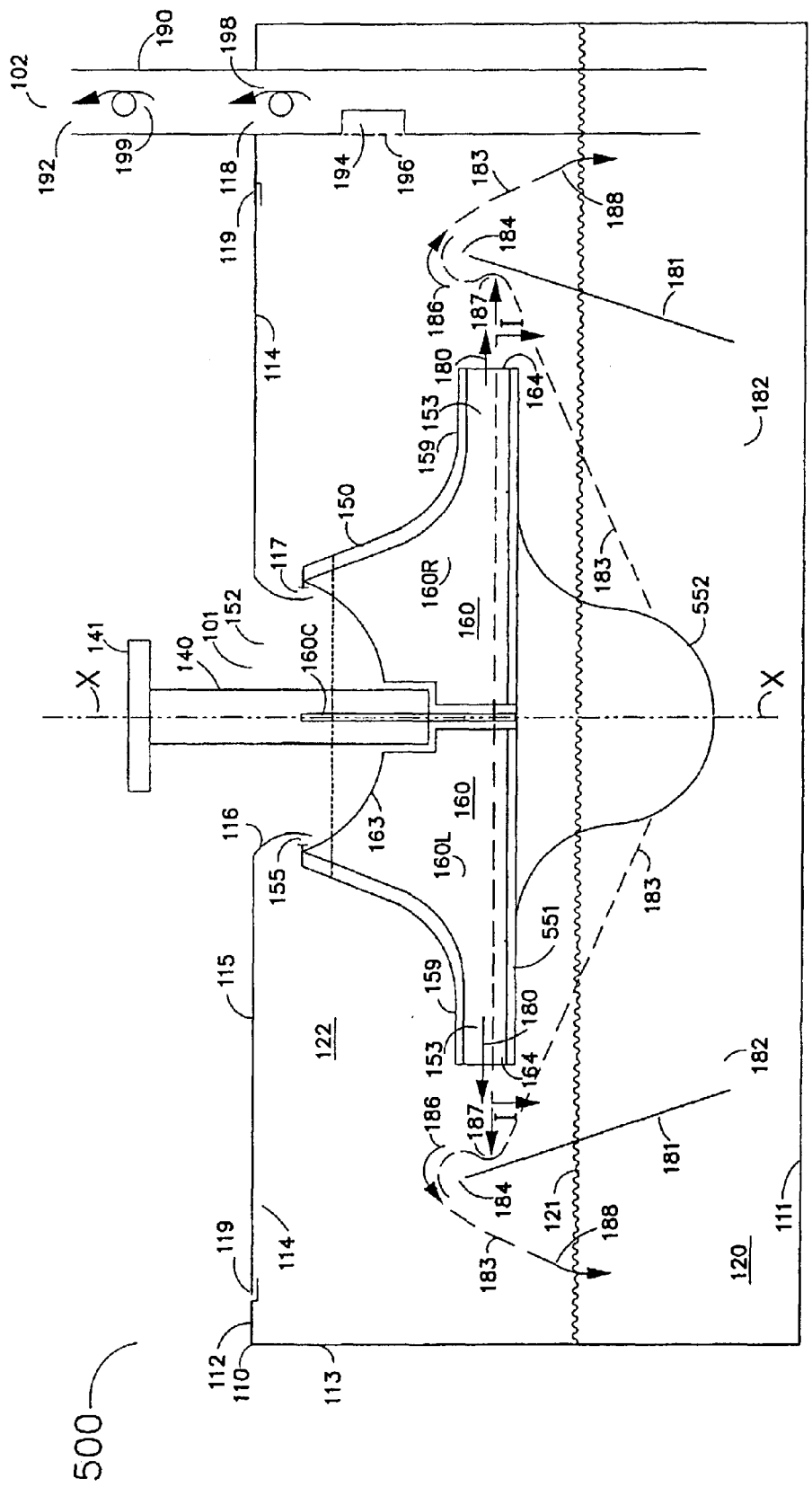
FIG. 5 is a schematic view of another embodiment of the gas scrubber of the present invention.

FIG. 5 is another embodiment of the present invention. All of the item numbers, except numbers 500, 551, and 552 used in FIG. 5 are the same as those used in FIG. 1. According, please refer to the definitions and descriptions used in FIG. 1 for all the remaining items in FIG. 5.

The only items unique to the apparatus of FIG. 5, as compared to the apparatus of FIG. 1, are those items numbered 551, and 552. The apparatus of FIG. 5 is referred to as scrubber 500. Number 150 is the upper cylinder and 551 is the lower channel housing forming channel 153. Rotating protrusion 552 is attached to lower channel housing 551 to rotate therewith. Rotating protrusion 552 is extended beneath surface 121 so that when rotating it rotates the liquid which takes the shape of 183 and extends over cone 181.

In FIG. 5, the upper cylinder housing 550 is shorter than centrifuge cylinder 150 of FIG. 1 and housing 150 is not used as a centrifuge housing. Also, the siphon pipe has been replaced by protrusion 552, and cyclone 190 is used instead of the exhaust fan used in scrubber 100 as taught by FIG. 1. This is to provide a more economical apparatus, although less efficient in some cases. The fan blades 160 are attached to shaft 140, housing 150, and lower channel housing 551 so that blades 160, housing 150, housing 551, and protrusion 552 all rotate with shaft 140.

The operation of scrubber 500 is summarized as follows. Container 110 contains liquid 120 and surface 121 is maintained by a level control means, not shown, similar to the one used on scrubber 100. Shaft 140 is rotated by motor 141 and cylinder 150, fan blades 160, protrusion 552, wall 159, including the lower portion 551 of channel 153, all of which rotate therewith. Gas is drawn through opening 152 by rotating blades 160 and flows down the inside of housing 150 and through channel 153 to space 122.

After the high velocity gas stream departs throat 164, it impacts surface 183, rotating up cone 181 by rotating protrusion 552, and mixes the gas with surface 183. The high velocity stream of gas breaks the surface tension of surface 183 and forces surface 183 against cone 181 as shown at 187 and liquid wets the particulates. Some of the combined stream is then carried by the stream of arrow 186 and is submerged beneath surface 121 and mixes some of the gas and liquid still further, as shown by 188.

Gas flows from space 122 tangentially to the inside of cyclone pipe 190 through opening 194 and spirals through cyclone pipe 190 as shown by arrow 198, and out outlet opening 192. Free liquid droplets coalesce on the inside wall of cyclone 190 and gravitate back down to liquid surface 121. Scrubbed gas 102 flows out outlet 192 as shown by arrow 199.

FIG. 6 is a schematic plan view of section line I—I of FIG. 5, identified generally by the numeral 600. In FIG. 6, shaft 640 rotates the fan housing having throat rim 659 in a clockwise rotation 670. Fan blades 160L, 160C, 160R, and 160 are radial tip blades as shown.

This drawing (FIG. 6) shows the direction of the resulting vector of the gas and liquid leaving the throat rim 659. The gas 610 follows the inside portion of the blade that is sloped inward toward the direction of rotation. Then, on the outside radial portion of the fan blade it flows in the direction of arrow 611 that gives a force of arrow 612. However, since the fan blade is rotating, the gas also has a directional force of arrow 614 and therefore a resultant force of arrow 616. Accordingly, the mixture flows off the rim as shown by arrows 680.

FIG. 7 also is a schematic plan view of section line I—I of FIG. 5, identified generally by the numeral unit 700. Unit 700 teaches an alternate way to arrange the fan blades that results in a concentrated stream of liquid and gas mixture out of the throat openings 720. In FIG. 7, shaft 740 rotates the fan housing having throat rim 759 in a clockwise rotation 770. Fan blades 160L, 160B, 160C, and 160B are radial blades as shown. The throat is partially plugged with baffle 790 so that the mixture can flow out of openings 720 only, providing a more concentrated stream of high velocity mixture.

The liquid in unit 700, being denser than the gas, is thrown in the direction of arrow 716 by the fan blades and the less dense gas takes the directions and positions of arrows 780 an 782, relative to the liquid. The high velocity liquid stream starts dispersing when it leaves the throat rim and forms many small droplets having space between them that becomes occupied by the gas. The denser liquid tends to maintain its velocity and direction longer than the less dense gas and tends to draw the gas with it. Accordingly, the liquid stream 716 tends to close the space 784 and tend to "cross" over the path of gas stream 782 and further mix with the gas.

FIG. 8 is a schematic elevation view of section line II—II of FIG. 7, showing an optional arrangement for the tip of blade 160R identified generally by the numeral 800. Apparatus 800 teaches an alternate way to shape the fan blades that result in multiple streams of liquid flowing out of the throat rim. In FIG. 8, wall 759 is the top and wall 750 is the bottom of the throat and the outer end of fan blade 760R is shown. The outer end of blade 760R is curved, as shown, and is provided with grooves 861, 862, 863, 864 and 865. The inner portion of blade 760R, not shown, is flat so that the liquid is distributed substantially equal to the grooves and the liquid comes out in a small stream for each groove.

FIG. 9 is a schematic elevation view of the liquid streams, 861L, 862L, 863L, 864L, and 865L, identified generally by the numeral 900, that flows out of grooves 861, 862, 863, 864, and 865 of FIG. 8. Please note that the liquid streams have the spaces 960 between the streams when they first depart the blade grooves. However, as soon as the streams 900 depart the grooves, the high velocity of the streams tend to cause the streams to enlarge and to disperse into many small droplets and the spaces between the streams tend to close. The spaces between the droplets and the streams become occupied by the gas and the gas, in these spaces and adjacent to the droplets become mixed with the liquid and is drawn by the liquid. The curvature of streams 900, caused by the curvature of the grooves in blade 760R of FIG. 8, tend to act as a "cup" and improves the mixing and drawing of the gas.

Figure 10:
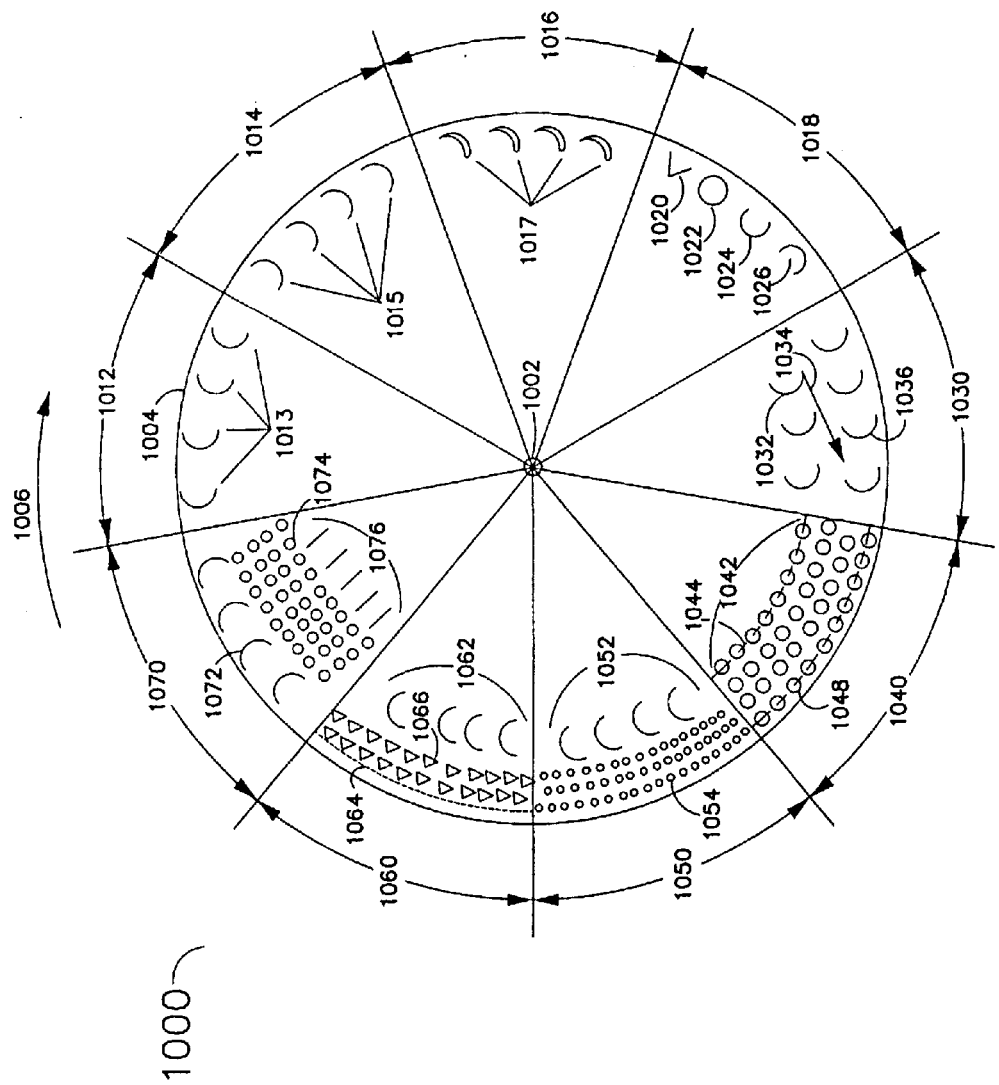
FIG. 10 is an alternate schematic plan view along the section line I—I of FIG. 5 showing different shapes and arrangements for the fan blades.

FIG. 10 is a schematic plan view of section line I—I of FIG. 5, showing how different combinations of fan blades can be used in the channel section of scrubber 500 of FIG.

5. The wheel of FIG. 10 is numbered wheel 1000 and the channels are not numbered.

In FIG. 10, wheel 1000 is attached to shaft 1002 and rotates in rotational direction 1006. Pie channel section 1012 of wheel 1000 shows how multiple forward curved fan blades 1013, as described by FIG. 12, can be positioned on the outside portion of wheel 1000. These forward curved fan blades are used on many residential applications and are generally noted for their quiet operation. Pie channel section 1014 of wheel 1000 shows how multiple backward inclined fan blades 1015, as described by FIG. 13, may be positioned on the outside portion of wheel 1000. These backward inclined fan blades 1015 are generally used where the blades may be subjected to corrosive or erosive environments. Pie channel section 1016 of wheel 1000 shows how multiple "airfoil" shaped fan blades 1017 can be positioned on the outside portion of wheel 1000. These airfoil shaped fan blades 1017 generally provide a higher efficiency fan and are used where energy savings are of prime importance.

So, it can be seen from the above that many shapes of fan blades can be used. The objective of a fan blade is to increase the velocity of a gas at the outside periphery of a fan blade by "slinging" the gas out and forward of the blades. This increased velocity decreases the initial gas pressure and draws the gas into the blades causing the gas flow. Therefore, the main factor used in designing any shape fan blade is to control the objectives of performance, efficiency, noise, and manufacturing cost. So, since almost any shape of surface that can increase the velocity of a gas at the outside fan blade rim may be used, FIG. 10 shows other unique shapes that the fan blades can take. Pie channel section 1018 shows a combined forward and backward straight blade 1020, a circular blade 1022, a semicircular blade 1024, and an inverted semicircle blade 1026. Of course, the efficiencies of these unique shapes of blades shown in section 1018 will vary considerably, but the blades of section 1018 are intended only to illustrate the various shapes that the blades may have.

Pie channel section 1030 of wheel 1000 of FIG. 10 teaches how multiple rows of blades, shown as backward inclined, can be positioned in the wheel. The outer row contains blade 1036 and the inner row contains blade 1032. Liquid "slung" off of blade 1032 takes a substantially tangential path 1034 and will impact blade 1036 as blade 1036 rotates into the path 1034. This means that gas is contacted by the liquid on the surface of inside blade 1032, the liquid stream between blade 1032 and blade 1036, the liquid on the surface of outside blade 1036, and the stream, not shown, that leaves the outside row of blades.

Pie channel section 1040 of wheel 1000 of FIG. 10 teaches how blades 1042 can be positioned in many duplicate rows in the wheel. These blades 1042 are shown as circles, but as previously mentioned, they can have any desired shape. Blades 1042 are shown in five rows with the inside row being marked 1044, the outside row marked as 1048, and the intermediate rows not marked. It can easily be seen that the many smaller blades increase the liquid surface for the gas to contact and that many rows increase the liquid paths between the blades for the gas to contact. Accordingly, in many cases, since many small blades have more surface than a few larger blades, multiple rows with many small blades are preferred on fan wheels using liquid to clean gas by contacting the gas with the liquid and these multiple rows with many small blades can be used on any of the previous scrubbers having channels with a flowing liquid.

Pie channel section 1050 of wheel 1000 of FIG. 10 teaches how the blades can be used with a combination of blade shapes. The inside row contains backward inclined blades 1052, and multiple groups of small cylindrically shaped blades are used for the outside rows. This allows the inside row to assist in pushing the gas through the outside blades.

It is well known that a very efficient method of scrubbing a gas is to flow the gas through a container filled with crushed stone. The crushed stone provides a large surface to contact the gas and the irregular shapes mix the directions of flow. However, such a method is like using a filter; it will eventually clog up and require cleaning or replacing. The flowing of liquid through wheel 1000 tends to continually clean irregular shape and surface and pie channel section 1060 of wheel 1000 of FIG. 10 teaches a typical method that these shapes can be used in combination with other blade shapes. The inside row of section 1060 contains backward inclined blades 1062 to assist in pushing the gas through the outside shapes. The outside row consists of screen 1064 and the intermediate rows consist of irregular shapes 1066. So, it can now be seen that many combinations of shapes for the blades, obstructions, and screens can be used for the flowing and mixing of the gas and liquid stream flowing through the various scrubbers of the present invention.

Pie channel section 1070 of wheel 1000 of FIG. 10 illustrates another way that the blade combinations can be arranged without departing from the scope of the present invention. In section 1070, backward inclined blades 1072 are positioned on the outside rim of wheel 1000 to assist in drawing the gas through the multiple rows of cylindrical blades 1074, and the inside row of radial blades 1076 tend to push the gas through blades 1074. When the liquid strikes the small cylindrical blades, it immediately flattens and spreads in all directions and completely coats the total surface of the blades. This offers a large area of wetted surface to contact the gas stream flowing by.

The obstructions 1066 and 1074 of pie channel sections 1060 and 1070 of FIG. 10 can obstruct and decrease the gas flow through the wheel considerably. However, this is a desired effect when using the channel, and fan wheel as a centrifuge to contact the gas stream with the liquid stream. A 12-inch fan wheel rotating at a rotational rate of 3500 RPM will produce a gravitational force of over 2000 at its rim to mix the gas with the liquid and to impinge contaminants with the surfaces of the wetted obstructions of FIG. 10 and a velocity of over 175 feet per second to impact the liquid surface 183 of FIG. 3 with the contaminates. So, it can be seen readily that it is easy to contact a flowing stream of gas with a flowing stream of liquid by exposing the streams to these gravitational and pressure forces in a tight area having irregular shapes and surfaces.

Combining the scrubber of FIG. 3 with some of the blade shapes of FIG. 10 and the second opening of FIG. 4 can be described in the following way.

A gas scrubber 300 (FIG. 3) for removing particulate and undesired gases from a gas stream 101, the scrubber comprising: a container 110 having a bottom wall 111 and a top wall 112 interconnected by a side wall 113 for containing a liquid 120 having a surface 121 with a selected level (121 when quiescent and 183 when in operation) forming a space 122 between the surface 121 and the top wall; the top wall having a section 115 with a top opening 105; a motor 141 positioned above the top wall opening 105 and having a rotatable shaft 140 extending down through the opening 105; a rotatable centrifugal vessel, connected to the shaft to rotate therewith, formed by an upper enclosure 350, having a centrally located inlet opening 152 positioned proximate the opening 105, and a lower enclosure 351, positioned below the upper enclosure 350, forming a vessel space 169; channel 153 and throat 164 formed by the upper and lower enclosure, having an inlet 168 positioned in the vessel space 169 and an outlet 164 positioned in the container space 122, formed by an upper and lower ring, with the inside of the upper ring connected to the outside of the upper enclosure 350 and the inside of the lower ring connected to the outside of the lower enclosure 351; circumferentially spaced fan blades 1076 (FIG. 10) positioned inside the channel to draw the gas 101 through the vessel space 169 and to force the gas through the channel 163 to the container space 122; obstructions, (one or a combination of 1032, 1044, 1054, 1064, 1066, of FIG. 10, or, 1606, 1608, 1610, and 1612 of FIG. 16) positioned in the channel proximate the outside edge of the wheel, to restrict the flow of the gas through the channel and to provide wetted surfaces for the gas to impact, to scrub the gas, when the gas is centrifugally forced over the surfaces; a rotatable siphon pipe 142 positioned below the lower enclosure 351 and attached to the shaft to rotate therewith; the siphon pipe 142 having a siphon inlet 143 disposed below the liquid surface 121 and a siphon outlet 144, larger than the inlet, projecting through the lower enclosure 351 to the vessel space 169; wherein the rotating siphon pipe 142 draws and rotates the liquid 120 up through the siphon pipe 142 and out the siphon pipe outlet 144 to the vessel space 169 and channel 163, allowing the liquid to mix with the gas and wet and clean the surfaces of the obstructions; and, a second opening 118 (FIG. 4) formed in the top wall 112 for discharging the scrubbed gas 102 from the space 122 to the outside of the container 110.

Figure 11:
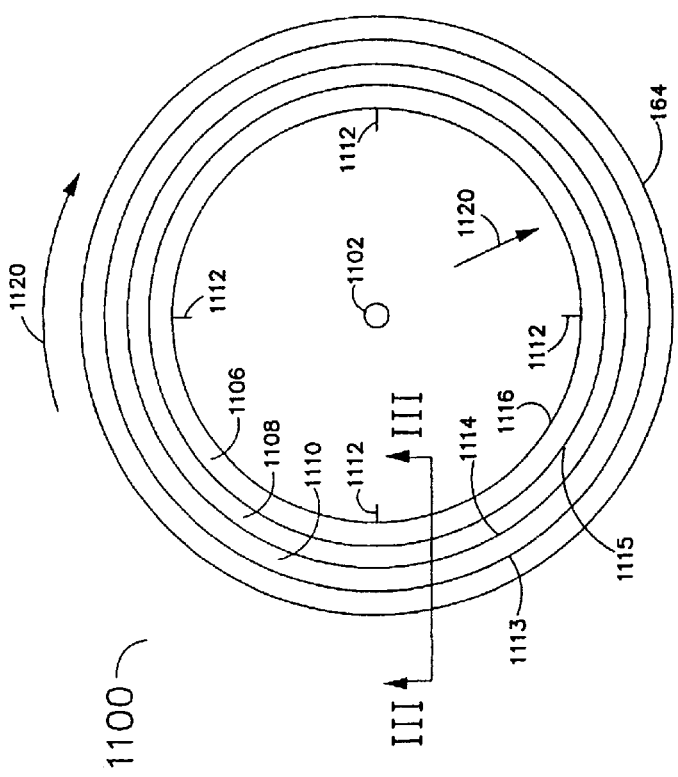
FIG. 11 is an alternate schematic plan view along the section line I—I of FIG. 5 showing circular obstructions on the outside portion of the fan wheel.

FIG. 11 is a schematic plan view of section line I—I of FIG. 5, showing another way to provide additional surface and provide centrifugal forces in the channels to mix the gas with the liquid and to separate the particulate from the gases. Section line I—I is a cut of channel 153 (not numbered in FIG. 11) which is shown in elevation view in FIG. 16. The channel of FIG. 11 is numbered channel 1100, having throat 164, and being rotated in rotational direction 1120 by shaft 1102. Radial fan blades 1112 are provided on the inner portion of the channel, as shown. Circular ridges 1113 and 1115 are provided on the top wall of the channel and circular ridges 1114 and 1116 are provided on the bottom wall of the channel. These top and bottom circular ridges are spaced such that they form spaces 1106, 1108, and 1110 between the ridges.

Figure 16:
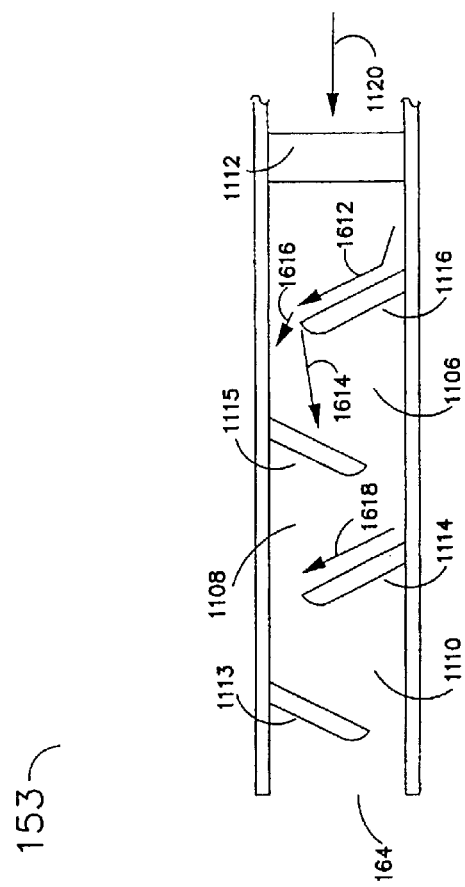
FIG. 16 is a schematic elevation view along the section line III—III of FIG. 11 showing the circular obstructions on the outside portion of the fan wheel.

FIG. 16 is a schematic elevation view of section line III—III of FIG. 11 of channel 153 showing one method of forming the spaces 1106, 1108, and 1110 with the upper ridges 1113 and 1115 and the lower ridges 1114 and 1116 of FIG. 11 and FIG. 16.

In FIG. 16, channel 153 has radial fan blades 1112 to move the gas through the channel. The top wall of channel 153 is provided with circular ridges 1113 and 1115 and the bottom wall of channel 153 is provided with circular ridges 1114 and 1116 and said ridges are spaced to provide spaces 1006, 1008, and 1010, all as shown and having the same item numbers as FIG. 11. When the liquid and gas mixture first contacts ridge 1116, it takes the path of arrow 1612 and the liquid wets the inside surface of ridge 1116. The inside surface of ridge 1116 provides an obstruction to the gas flow, which centrifugally causes the heavier particulate in the gas to contact the wetted inside surface of ridge 1116 and mixes the particulate with the liquid. When the liquid and gas leaves the tip of ridge 1116, centrifugal force causes the liquid and gas, with wetted particulate, to take the direction of arrow 1614 and to contact the inside wetted surface of the next ridge 1115. However, entrained particulate that have not yet contacted the liquid, take the flow direction of arrow 1616, when they flow over the tip of ridge 1116, and contacts the wetted surface of the next ridge. These multiple circular ridges offer a large surface area to obstruct the gas and liquid flow and centrifugally force the particulate against the wetted ridge surfaces. The high velocity flow of liquid and gas between a ridge tip and the next ridge surface also helps mix the liquid and gas and wet the particulate. It is noted that although only four ridges are shown in channel 153 of FIG. 16, any selected number of ridges can be used.

The fan inlet housings 150 of FIGS. 3, 4, and 5, and the siphon pipes 142 of FIGS. 3 and 4 all rotate with the rotating shafts 140. These rotating housings and siphon pipes serve as "closed" impellers and are very efficient. Impellers are not shown on any of the siphon pipes because inventor has found that they are usually not necessary. However, in some cases, putting impellers in the siphon pipe may decrease the size and improve the efficiency, and if impellers are put in the siphon pipe, it is not necessary for the siphon pipe housing to rotate if the impellers rotate. Accordingly, it is not necessary for the fan housing and siphon pipe housing to rotate if the fan and impellers are designed as "open" impellers that rotate with the shaft. This is demonstrated in FIG. 17.

Figure 17:
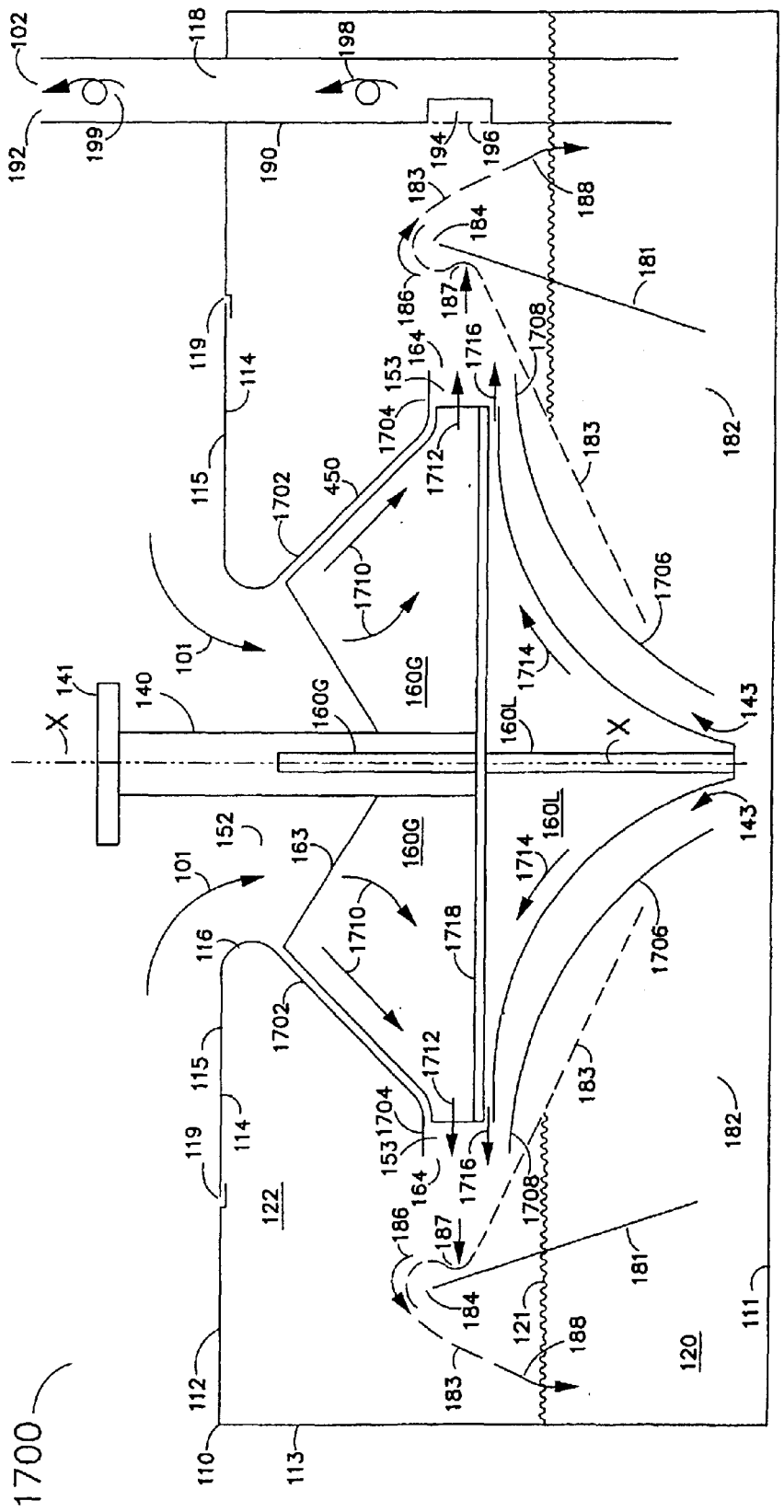
FIG. 17 is a schematic view of another embodiment of the gas scrubber of the present invention.

FIG. 17 is another embodiment of the present invention. All of the item numbers, except numbers 1700, 1702, 1704, 1706, 1708, 1710, 1712, 1714, 1716, 1718, 160G and 160L, used in FIG. 17 are the same as those used in FIG. 1. Accordingly, please refer to the definitions and descriptions used in FIG. 1 for all the remaining items in FIG. 17.

The apparatus of FIG. 17 is referred to as scrubber 1700. Number 1702 is the upper fan stationary housing that is connected to wall 1704 forms the upper portion of channel 153. The lower pump impeller stationary housing 1706 is connected to wall 1708 and forms the lower portion of channel 153 and throat 164. Gas is drawn into the gas housing by fan blades 160G, having back plate 1718, as shown by arrows 1710, and flows out the throat as shown by arrows 1712. Liquid is drawn in by the pump impellers 160L, as shown by arrows 143 and 1714 and flows out the throat as shown by arrows 1716.

The operation of scrubber 1700 is summarized as follows. Container 110 contains liquid 120, and surface 121 is maintained by a level control means, not shown, similar to the one used on scrubber 100. Motor 141 rotates shaft 140 and fan blades 160G positioned on the upper side of back plate 1718, and pump impellers 160L on the lower side of back plate 1718. Gas is drawn through opening 152 by rotating blades 160G and flows down the inside of stationary housing 1702, as shown by arrows 1710, and through channel 153 and throat 164, as shown by arrows 1712, to space 122. Liquid 120 is drawn by rotating pump impellers 160L through the pump housing inlet 143 and pump housing 1706, as shown by arrows 1714, and is pumped out channel 153 and throat 164 as shown by arrows 1716. The liquid flowing through throat 164 helps draw the gas through channel 153. Channel 153 and throat 164 combine at the outlets of fan blades 160G and pump impellers 160L and the liquid and gas mix when they flow through Channel 153 and throat 164 wetting particulate and absorbing molecules as the mixture flows through the throats.

The submerged portion of pump impellers 160L rotates the adjacent liquid 120 and such rotating liquid rotates up cone 181 and assumes the new surface 183 which rotates over the top 184 of cone 181. After the high velocity liquid and gas mixture stream departs throat 164, it impacts surface 183 and mixes the gas and liquid further. The high velocity mixture stream of gas and liquid forces surface 183 against cone 181 as shown at 187 and, since it impacts stream 183 tangentially, it helps in rotating the liquid over the cone. Some of the combined stream is then carried by the stream of arrow 186 and is submerged beneath surface 121 and mixes some of the gas and liquid still further, as shown by 188.

Gas flows from space 122 tangentially to the inside of cyclone pipe 190 through opening 194 and spirals through cyclone pipe 190 as shown by arrow 198, and out outlet opening 192. Free liquid droplets coalesce on the inside wall of cyclone 190 and gravitate back down to liquid surface 121. Scrubbed gas 102 flows out outlet 192 as shown by arrow 199.

Although the present invention and its advantages have been described in relation to the illustrated embodiments, it should be understood that various changes, substitutions and alterations can be made without departing from the spirit and scope of the invention as defined by the claims. The following are some examples of such substitutions:

Most of the fan blades can selectively be either forward curved, backward inclined, radial, radial tip, multiple rows, or combinations of other configurations, without departing from the scope of the present invention.

Inlet circular housing 103 of FIG. 1 can be omitted or used on any of the scrubbers.

Cone 181 can be omitted on any of the scrubbers and the wall 113 used to let the rotating liquid rise up the wall. Or, the wall can be cone shaped. However, inventor has found that using the wall 113 as a back stop for the rotating liquid usually results in a noisier and less efficient scrubber.

It is not necessary to use channel 163 and throat 164 on any of the scrubbers utilizing a centrifuge cylinder. However, inventor has found that the use of such throat with such scrubbers usually results in a more efficient scrubber.

Liquid inlet pipe 124 and liquid outlet pipe 127 used on scrubber 100 of FIG. 1 can be used on any of the scrubbers. Inventor has found that when removing ash from a high temperature stream of gas containing a large percentage of ash, a continuous stream of dirty liquid must be removed through outlet pipe 127. This dirty stream must be cleaned by centrifuge, filter, or other method and then can be reused. It has also been found that if water is used as the liquid on some such high temperature streams, a tight and difficult emulsion is formed. In such cases it is best to use a high boiling point oil and to maintain the liquid temperature above the boiling point of water.

It is not necessary for upper housing 150 of FIGS. 3, 4, and 5 to rotate with the lower housings. These upper housings can be stationary but the lower partitions or housings with the fan blades must rotate. However, the scrubbers are not as efficient if the upper housings do not rotate.

What is claimed is:

1. A gas scrubber for removing particulate and undesired gases from a gas stream, said scrubber comprising:
   a container having a bottom wall and a top wall interconnected by a side wall for containing a liquid having a surface forming a space between said surface and said top wall and having a container opening in said top wall;
   a rotatable centrifugal cylinder mounted vertically in said container opening, said cylinder having a cylinder inlet positioned exterior said top wall and a cylinder outlet opening, larger than said cylinder inlet opening, positioned in said space;
   a driving mechanism positioned above said container opening having a rotatable shaft connected to said cylinder to rotate said cylinder;
   a first rotatable siphon pipe positioned inside of said cylinder and connected to said rotatable shaft, said first siphon pipe having a siphon inlet disposed below said liquid surface and a siphon outlet, larger then said siphon inlet, positioned proximate said cylinder inlet wherein said rotating siphon pipe draws and rotates said liquid through said siphon pipe to the inside of said cylinder proximate said cylinder inlet flowing down the inside of said cylinder from said cylinder inlet to said cylinder outlet to cleanse the inside cylinder wall of said centrifugally separated particulate;
   fan blades connected to said first siphon pipe and positioned inside said cylinder to draw said gas through said cylinder; and
   a second opening formed through said container for discharging said scrubbed gas from said space to the exterior of said container.

2. The gas scrubber of claim 1 further including:
   a sleeve positioned in said second opening, said sleeve having an outlet disposed outside of said container and a sleeve inlet disposed in said space; and
   a partition connected inside said sleeve to cause gas flowing through said sleeve inlet to enter said sleeve inlet tangentially causing circular flow of said gas through said sleeve.

3. The gas scrubber of claim 1 further including:
   a rotatable exhaust fan back plate attached to an upper outside portion of said cylinder and positioned in said space beneath said second opening to rotate in said space with said cylinder;
   exhaust fan blades attached to a bottom of said back plate; and
   a partition attached to said side wall and positioned horizontally in said space below said exhaust fan blades, said partition having an exhaust fan inlet opening in the center thereof to said exhaust fan blades in a manner such that rotating said exhaust fan blades draw scrubbed gas from said container space through said exhaust fan inlet opening through said second opening.

4. The gas scrubber of claim 3 further including:
   a sump positioned between an outer extremity of said partition and said side wall to collect liquid droplets that coalesce and gravitate down said side wall; and
   a drain pipe having an inlet opening inside said sump and an outlet opening positioned below said surface.

5. The gas scrubber of claim 1 wherein tips of said fan blades are provided with grooves to divide said liquid flowing out of said throat into separate streams.

6. The gas scrubber of claim 2 wherein tips of said fan blades are provided with grooves to divide said liquid flowing out of said throat into separate streams.

7. The gas scrubber of claim 3 wherein tips of said fan blades are provided with grooves to divide said liquid flowing out of said throat into separate streams.

8. The gas scrubber of claim 1 further including:
   a rotatable throat having an inlet and an outlet formed by an upper housing and a lower housing, said inlet connected to said cylinder outlet to allow said gas stream to flow from the exterior of said container through said cylinder and said throat outlet to said space; and throat fan blades positioned inside said throat to propel said liquid and said gas stream from said cylinder outlet and from said second siphon pipe through said throat at a high velocity to mix said liquid with said gas to scrub said gas.

9. The gas scrubber of claim 2 further including:

a rotatable throat having an inlet and an outlet formed by an upper housing and a lower housing, said inlet connected to said cylinder outlet to allow said gas stream to flow from the exterior of said container through said cylinder and said throat outlet to said space; and throat fan blades positioned inside said throat to propel said liquid and said gas stream from said cylinder outlet and from said second siphon pipe through said throat at a high velocity to mix said liquid with said gas to scrub said gas.

10. The gas scrubber of claim 3 further including:

a rotatable throat having an inlet and an outlet formed by an upper housing and a lower housing, said inlet connected to said cylinder outlet to allow said gas stream to flow from the exterior of said container through said cylinder and said throat outlet to said space; and throat fan blades positioned inside said throat to propel said liquid and said gas stream from said cylinder outlet and from said second siphon pipe through said throat at a high velocity to mix said liquid with said gas to scrub said gas.

11. The gas scrubber of claim 5 further including:

a rotatable throat having an inlet and an outlet formed by an upper housing and a lower housing, said inlet connected to said cylinder outlet to allow said gas stream to flow from the exterior of said container through said cylinder and said throat outlet to said space; and throat fan blades positioned inside said throat to propel said liquid and said gas stream from said cylinder outlet and from said second siphon pipe through said throat at a high velocity to mix said liquid with said gas to scrub said gas.

12. The gas scrubber of claim 6 further including:

a rotatable throat having an inlet and an outlet formed by an upper housing and a lower housing, said inlet connected to said cylinder outlet to allow said gas stream to flow from the exterior of said container through said cylinder and said throat outlet to said space; and throat fan blades positioned inside said throat to propel said liquid and said gas stream from said cylinder outlet and from said second siphon pipe through said throat at a high velocity to mix said liquid with said gas to scrub said gas.

13. The gas scrubber of claim 7 further including:

a rotatable throat having an inlet and an outlet formed by an upper housing and a lower housing, said inlet connected to said cylinder outlet to allow said gas stream to flow from the exterior of said container through said cylinder and said throat outlet to said space; and throat fan blades positioned inside said throat to propel said liquid and said gas stream from said cylinder outlet and from said second siphon pipe through said throat at a high velocity to mix said liquid with said gas to scrub said gas.

14. The gas scrubber of claim 8 wherein an outer extremity of said fan blades is attached to the inside of said cylinder and is provided with grooves to allow circulation and equalization of liquid flowing down the inside of said cylinder.

15. The gas scrubber of claim 10 wherein an outer extremity of said fan blades is attached to the inside of said cylinder and is provided with grooves to allow circulation and equalization of liquid flowing down the inside of said cylinder.

16. The gas scrubber of claim 11 wherein an outer extremity of said fan blades is attached to the inside of said cylinder and is provided with grooves to allow circulation and equalization of liquid flowing down the inside of said cylinder.

17. The gas scrubber of claim 8 wherein said throat outlet is provided with restrictions that prevent said gas from flowing out of selected areas of said throat outlet.

18. The gas scrubber of claim 10 wherein said throat outlet is provided with restrictions that prevent said gas from flowing out of selected areas of said throat outlet.

19. The gas scrubber of claim 11 wherein said throat outlet is provided with restrictions that prevent said gas from flowing out of selected areas of said throat outlet.

20. The gas scrubber of claim 14 wherein said throat outlet is provided with restrictions that prevent said gas from flowing out of selected areas of said throat outlet.

21. The gas scrubber of claim 15 wherein said throat outlet is provided with restrictions that prevent said gas from flowing out of selected areas of said throat outlet.

22. The gas scrubber of claim 8 further including a cone positioned outside said throat outlet, said cone having a slope with a small end cone inlet opening positioned beneath said surface and a large end cone outlet opening positioned in said container space outside and above said throat outlet.

23. The gas scrubber of claim 10 further including a cone positioned outside said throat outlet, said cone having a slope with a small end cone inlet opening positioned beneath said surface and a large end cone outlet opening positioned in said container space outside and above said throat outlet.

24. The gas scrubber of claim 11 further including a cone positioned outside said throat outlet, said cone having a slope with a small end cone inlet opening positioned beneath said surface and a large end cone outlet opening positioned in said container space outside and above said throat outlet.

25. The gas scrubber of claim 14 further including a cone positioned outside said throat outlet, said cone having a slope with a small end cone inlet opening positioned beneath said surface and a large end cone outlet opening positioned in said container space outside and above said throat outlet.

26. The gas scrubber of claim 15 further including a cone positioned outside said throat outlet, said cone having a slope with a small end cone inlet opening positioned beneath said surface and a large end cone outlet opening positioned in said container space outside and above said throat outlet.

27. The gas scrubber of claim 17 further including a cone positioned outside said throat outlet, said cone having a slope with a small end cone inlet opening positioned beneath said surface and a large end cone outlet opening positioned in said container space outside and above said throat outlet.

28. The gas scrubber of claim 18 further including a cone positioned outside said throat outlet, said cone having a slope with a small end cone inlet opening positioned beneath said surface and a large end cone outlet opening positioned in said container space outside and above said throat outlet.

29. The gas scrubber of claim 19 further including a cone positioned outside said throat outlet, said cone having a slope with a small end cone inlet opening positioned beneath said surface and a large end cone outlet opening positioned in said container space outside and above said throat outlet.

30. A gas scrubber for removing particulate and undesired gases from a gas stream, said scrubber comprising:
- a container having a bottom wall and a top wall interconnected by a side wall for containing a liquid having a surface forming a space between said surface and said top wall and having a container opening in said top wall;
- a rotatable centrifugal cylinder mounted vertically in said container opening, said cylinder having a cylinder inlet positioned exterior said top wall and a cylinder outlet opening, larger than said cylinder inlet opening, positioned in said space;
- a rotatable throat having an inlet and an outlet formed by an upper housing and a lower housing, said inlet connected to said cylinder outlet to allow said gas stream to flow from the exterior of said container through said cylinder and said throat outlet to said space;
- a driving mechanism positioned above said container opening having a rotatable shaft connected to said cylinder to rotate said cylinder;
- a first rotatable siphon pipe positioned on the inside of said cylinder and connected to said rotatable shaft, said first siphon pipe having a siphon inlet disposed below said liquid surface and a siphon outlet, larger then said siphon inlet, positioned proximate said cylinder inlet wherein said rotating siphon pipe draws and rotates said liquid through said siphon pipe to the inside of said cylinder proximate said cylinder inlet flowing down the inside of said cylinder from said cylinder inlet to said cylinder outlet and to said throat inlet to cleanse the inside cylinder wall of said centrifugally separated particulate;
- a second rotatable siphon pipe mounted on said first siphon pipe, said second siphon pipe having a siphon inlet disposed below said liquid surface and a siphon outlet, larger than said siphon inlet, connected to an inlet of said lower housing;
- fan blades connected to said first siphon pipe and positioned inside said cylinder to draw said gas through said cylinder;
- throat fan blades positioned inside said throat to propel said liquid and said gas stream from said cylinder outlet and from said second siphon pipe through said throat at a high velocity to mix said liquid with said gas to scrub said gas; and
- a second opening formed through said container for discharging said scrubbed gas from said space to the exterior of said container.

31. The gas scrubber of claim 30 further including:
- a sleeve positioned in said second opening, said sleeve having an outlet disposed outside of said container and a sleeve inlet disposed in said space; and
- a partition connected inside said sleeve to cause gas flowing through said sleeve inlet to enter said sleeve inlet tangentially causing circular flow of said gas through said sleeve.

32. The gas scrubber of claim 30 further including:
- a liquid supply connected to said container; and
- a level controller connected between said liquid supply and said container for passing liquid from said liquid supply to said container to maintain said liquid surface in said container.

33. The gas scrubber of claim 30 further including a cone positioned outside said throat outlet, said cone having a slope with a small end cone inlet opening positioned beneath said surface and a large end cone outlet opening positioned in said container space outside and above said throat outlet.

34. The gas scrubber of claim 30 further including:
- a rotatable exhaust fan back plate attached to an upper outside portion of said cylinder and positioned in said space beneath said second opening to rotate in said space with said cylinder;
- exhaust fan blades attached to a bottom of said back plate; and
- a partition attached to said side wall and positioned horizontally in said space below said exhaust fan blades, said partition having an exhaust fan inlet opening in the center thereof to said exhaust fan blades in a manner such that rotating said exhaust fan blades draw scrubbed gas from said container space through said exhaust fan inlet opening through said second opening.

35. The gas scrubber of claim 34 further including:
- a sump positioned between an outer extremity of said partition and said side wall to collect liquid droplets that coalesce and gravitate down said side wall; and
- a drain pipe having an inlet opening inside said sump and an outlet opening positioned below said surface.

36. The gas scrubber of claim 30 wherein tips of said fan blades are provided with grooves to divide said liquid flowing out of said throat into separate streams.

37. The gas scrubber of claim 30 wherein said throat outlet is provided with restrictions that prevent said gas from flowing out of selected areas of said throat outlet.

38. The gas scrubber of claim 30 wherein an outer extremity of said fan blades is attached to the inside of said cylinder and is provided with grooves to allow circulation and equalization of liquid flowing down the inside of said cylinder.

39. The gas scrubber of claim 33 further including:
- a rotatable exhaust fan back plate attached to an upper outside portion of said cylinder and positioned in said space beneath said second opening to rotate in said space with said cylinder;
- exhaust fan blades attached to a bottom of said back plate; and
- a partition attached to said side wall and positioned horizontally in said space below said exhaust fan blades, said partition having an exhaust fan inlet opening in the center thereof to said exhaust fan blades in a manner such that rotating said exhaust fan blades draw scrubbed gas from said container space through said exhaust fan inlet opening through said second opening.

40. The gas scrubber of claim 39 further including:
- a sump positioned between an outer extremity of said partition and said side wall to collect liquid droplets that coalesce and gravitate down said side wall; and
- said a drain pipe having an inlet opening inside said sump and an outlet opening positioned below said surface.

41. The gas scrubber of claim 33 wherein tips of said throat fan blades are provided with grooves to divide said liquid flowing out of said throat into separate streams.

42. The gas scrubber of claim 39 wherein tips of said throat fan blades are provided with grooves to divide said liquid flowing out of said throat into separate streams.

43. The gas scrubber of claim 40 wherein tips of said throat fan blades are provided with grooves to divide said liquid flowing out of said throat into separate streams.

44. The gas scrubber of claim 33 wherein said throat outlet is provided with restrictions that prevent said gas from flowing out of selected areas of said throat outlet.

45. The gas scrubber of claim 39 wherein said throat outlet is provided with restrictions that prevent said gas from flowing out of selected areas of said throat outlet.

46. The gas scrubber of claim 41 wherein said throat outlet is provided with restrictions that prevent said gas from flowing out of selected areas of said throat outlet.

47. The gas scrubber of claim 42 wherein said throat outlet is provided with restrictions that prevent said gas from flowing out of selected areas of said throat outlet.

48. The gas scrubber of claim 33 wherein said throat outlet is provided with restrictions that prevent said gas from flowing out of selected areas of said throat outlet.

49. The gas scrubber of claim 41 wherein an outer extremity of said fan blades is attached to the inside of said cylinder and is provided with grooves to allow circulation and equalization of liquid flowing down the inside of said cylinder.

50. The gas scrubber of claim 42 wherein an outer extremity of said fan blades is attached to the inside of said cylinder and is provided with grooves to allow circulation and equalization of liquid flowing down the inside of said cylinder.

51. The gas scrubber of claim 44 wherein an outer extremity of said fan blades is attached to the inside of said cylinder and is provided with grooves to allow circulation and equalization of liquid flowing down the inside of said cylinder.

52. The gas scrubber of claim 45 wherein an outer extremity of said fan blades is attached to the inside of said cylinder and is provided with grooves to allow circulation and equalization of liquid flowing down the inside of said cylinder.

53. The gas scrubber of claim 46 wherein an outer extremity of said fan blades is attached to the inside of said cylinder and is provided with grooves to allow circulation and equalization of liquid flowing down the inside of said cylinder.

54. The gas scrubber of claim 47 wherein an outer extremity of said fan blades is attached to the inside of said cylinder and is provided with grooves to allow circulation and equalization of liquid flowing down the inside of said cylinder.

55. A gas scrubber for removing particulate and undesired gases from a gas stream, said scrubber comprising:
- a container having a bottom wall and a top wall interconnected by a side wall for containing a liquid having a surface forming a space between said surface and said top wall, said top wall having an opening;
- a driving mechanism positioned above said opening having a rotatable shaft extending through said opening;
- a rotatable circular fan positioned in said space and connected to said shaft to rotate therewith having a fan inlet opening positioned proximate said top wall opening and an outlet opening positioned in said space;
- a siphon pipe connected to said shaft and positioned below said fan having a siphon inlet disposed below said liquid surface and a siphon outlet, larger than said siphon inlet;
- a rotatable circular throat formed by an upper circular housing and a lower circular housing, said lower circular housing connected to said siphon pipe, said upper circular housing forming a throat inlet functionally connected to said fan outlet and a throat outlet opened to said space for said gas stream to flow from outside said container through said fan and said throat to said space;
- fan blades positioned inside said throat; and
- a second opening formed through said container for discharging said scrubbed gas from said space exterior of said container.

56. The gas scrubber of claim 55 further including:
- a sleeve positioned in said second opening, said sleeve having an outlet disposed outside of said container and a sleeve inlet disposed in said space; and
- a partition connected inside said sleeve to cause gas flowing through said sleeve inlet to enter said sleeve inlet tangentially causing circular flow of said gas through said sleeve.

57. The gas scrubber of claim 55 further including:
- a liquid supply connected to said container; and
- a level controller connected between said liquid supply and said container for passing liquid from said liquid supply to said container to maintain said liquid surface in said container.

58. The gas scrubber of claim 55 further including a cone positioned outside said throat outlet, said cone having a slope with a small end cone inlet opening positioned beneath said surface and a large end cone outlet opening positioned in said container space outside and above said throat outlet.

59. The gas scrubber of claim 55 further including:
- a rotatable exhaust fan back plate attached to an upper outside portion of said fan and positioned in said space beneath said second opening to rotate in said space with said fan;
- exhaust fan blades attached to a bottom of said back plate; and
- a partition attached to said side wall and positioned horizontally in said space below said exhaust fan blades, said partition having an exhaust fan inlet opening in the center thereof to said exhaust fan blades in a manner such that rotating said exhaust fan blades draw scrubbed gas from said container space through said exhaust fan inlet opening through said second opening.

60. The gas scrubber of claim 59 further including:
- a sump positioned between an outer extremity of said partition and said side wall to collect liquid droplets that coalesce and gravitate down said side wall; and
- a drain pipe having an inlet opening inside said sump and an outlet opening positioned below said surface.

61. The gas scrubber of claim 55 wherein tips of said fan blades are provided with grooves to divide said liquid flowing out of said throat into separate streams.

62. The gas scrubber of claim 55 wherein said throat outlet is provided with restrictions that prevent said gas from flowing out of selected areas of said throat outlet.

63. The gas scrubber of claim 58 wherein tips of said fan blades are provided with grooves to divide said liquid flowing out of said throat into separate streams.

64. The gas scrubber of claim 58 wherein said throat outlet is provided with restrictions that prevent said gas from flowing out of selected areas of said throat outlet.

65. The gas scrubber of claim 59 wherein tips of said fan blades are provided with grooves to divide said liquid flowing out of said throat into separate streams.

66. The gas scrubber of claim 59 wherein said throat outlet is provided with restrictions that prevent said gas from flowing out of selected areas of said throat outlet.

67. The gas scrubber of claim 55 further including means to continuously recirculate said liquid in said container.

68. A gas scrubber for removing particulate and undesired gases from a gas stream, said scrubber comprising:
- a container having a bottom wall and a top wall interconnected by a side wall for containing a liquid having a surface forming a container space between said surface and said top wall, said top wall having a container opening;
- a driving mechanism having a rotatable shaft extending down through said container opening;
- a fan space defined by an upper circular housing and a lower circular housing positioned within said container space, said upper circular housing having a fan inlet opening positioned proximate said container opening and said lower circular housing forming a lower inlet opening;
- a circular outlet throat formed by said upper circular housing and said lower circular housing;
- a rotatable circular fan having fan blades positioned in said fan space and connected to said shaft wherein said gas stream flows from outside said container through said container opening, said fan inlet opening into said fan space and through said outlet throat to said container space;
- a rotatable siphon pipe positioned below said fan and connected to said rotatable shaft; said siphon pipe having a siphon inlet disposed below said liquid surface and a siphon outlet, larger then said siphon inlet, connected to said lower housing inlet opening, wherein said rotating siphon pipe draws and rotates said liquid through said siphon pipe into said lower housing inlet opening and through said throat, said siphon pipe rotating said liquid in said container causing said rotating liquid to gravitate up said side wall and form an additional liquid surface in front of said throat outlet;
- obstructions positioned in said throat proximate a peripheral edge of said throat to restrict flow of said gas through said throat and to provide wetted surfaces for said gas to impact and scrub said gas when said gas is centrifugally forced over said surfaces; and
- a second opening formed in said top wall for discharging said scrubbed gas from said space to the outside of said container.

69. The gas scrubber of claim 68 further including:
- a sleeve positioned in said second opening, said sleeve having an outlet disposed outside of said container and a sleeve inlet disposed in said space; and
- a partition connected inside said sleeve to cause gas flowing through said sleeve inlet to enter said sleeve inlet tangentially causing circular flow of said gas through said sleeve.

70. The gas scrubber of claim 68 further including:
- a liquid supply connected to said container; and
- a level controller connected between said liquid supply and said container for passing liquid from said liquid supply to said container to maintain said liquid surface in said container.

71. The gas scrubber of claim 68 further including a cone positioned outside said throat outlet, said cone having a slope with a small end cone inlet opening positioned beneath said surface and a large end cone outlet opening positioned in said container space outside and above said throat outlet.

72. The gas scrubber of claim 68 further including:
- a rotatable exhaust fan back plate attached to an upper outside portion of said upper housing and positioned in said space beneath said second opening to rotate in said space with said fan;
- exhaust fan blades attached to a bottom of said back plate; and
- a partition attached to said side wall and positioned horizontally in said space below said exhaust fan blades, said partition having an exhaust fan inlet opening in the center thereof to said exhaust fan blades in a manner such that rotating said exhaust fan blades draw scrubbed gas from said container space through said exhaust fan inlet opening through said second opening.

73. The gas scrubber of claim 72 further including:
- a sump positioned between an outer extremity of said partition and said side wall to collect liquid droplets that coalesce and gravitate down said side wall; and
- a drain pipe having an inlet opening inside said sump and an outlet opening positioned below said surface.

74. The gas scrubber of claim 68 wherein tips of said fan blades are provided with grooves to divide said liquid flowing out of said throat into separate streams.

75. The gas scrubber of claim 68 wherein said throat outlet is provided with restrictions that prevent said gas from flowing out of selected areas of said throat outlet.

76. The gas scrubber of claim 71 wherein tips of said fan blades are provided with grooves to divide said liquid flowing out of said throat into separate streams.

77. The gas scrubber of claim 71 wherein said throat outlet is provided with restrictions that prevent said gas from flowing out of selected areas of said throat outlet.

78. The gas scrubber of claim 72 wherein tips of said fan blades are provided with grooves to divide said liquid flowing out of said throat into separate streams.

79. The gas scrubber of claim 72 wherein said throat outlet is provided with restrictions that prevent said gas from flowing out of selected areas of said throat outlet.

80. The gas scrubber of claim 68 further including means to continuously recirculate said liquid in said container.

81. A gas scrubber for removing particulate and undesired gases from a gas stream, said scrubber comprising:
- a container having a bottom wall and a top wall interconnected by a side wall for containing a liquid having a surface forming a container space between said surface and said top wall, said top wall having an opening;
- a driving mechanism positioned above said top wall opening having a rotatable shaft extending through said opening;
- a rotatable upper and lower housing positioned within said container space and connected to said shaft, said housings forming a housing space therebetween, said upper housing having an upper inlet opening positioned proximate said container opening and said lower housing having a lower inlet opening;
- a circular throat defined by the periphery of said upper and said lower housings, said upper housing having an upper throat ring and said lower housing having a lower throat ring located thereon;
- a rotatable siphon pipe positioned below said lower housing and connected to said shaft to rotate therewith having a siphon inlet disposed below said liquid surface and a siphon outlet, larger than said siphon inlet, connected to said lower housing inlet opening, wherein said rotating siphon pipe draws and rotates said liquid up through said siphon pipe, said siphon pipe outlet and said lower housing inlet opening to flow through said housing space and said throat;
- upper circular ridges attached to a lower side of said upper throat ring forming upper ridge spaces between said upper ridges and lower summit spaces between tips of said upper ridges and said lower throat ring;

lower circular ridges extending from an upper side of said lower throat ring projecting up into said upper ridge spaces providing a passage space between said upper and lower ridges and forming upper ridge summit spaces between the tips of said lower ridges and said upper throat ring, said upper and lower ridges providing a swerving passageway through said summit spaces and said passage space that allows said rotating housings to centrifugally draw said gas and liquid from said housing inlets and force said gas and liquid through said summit and passage spaces to impact said gas and liquid against the surfaces of said ridges, to wet said particulate and scrub said gas; and a second opening formed in said top wall for discharging said scrubbed gas from said space to the outside of said container.

82. The gas scrubber of claim 81 further including:

a sleeve positioned in said second opening, said sleeve having an outlet disposed outside of said container and a sleeve inlet disposed in said space; and a partition connected inside said sleeve to cause gas flowing through said sleeve inlet to enter said sleeve inlet tangentially causing circular flow of said gas through said sleeve.

83. The gas scrubber of claim 81 further including:

a liquid supply connected to said container; and a level controller connected between said liquid supply and said container for passing liquid from said liquid supply to said container to maintain said liquid surface in said container.

84. The gas scrubber of claim 81 further including a cone positioned outside said throat outlet, said cone having a slope with a small end cone inlet opening positioned beneath said surface and a large end cone outlet opening positioned in said container space outside and above said throat outlet.

85. The gas scrubber of claim 81 further including fan blades positioned inside said housing space.

86. The gas scrubber of claim 85 further including:

a sleeve positioned in said second opening, said sleeve having an outlet disposed outside of said container and a sleeve inlet disposed in said space; and a partition connected inside said sleeve to cause gas flowing through said sleeve inlet to enter said sleeve inlet tangentially causing circular flow of said gas through said sleeve.

87. The gas scrubber of claim 85 further including:

a liquid supply connected to said container; and a level controller connected between said liquid supply and said container for passing liquid from said liquid supply to said container to maintain said liquid surface in said container.

88. The gas scrubber of claim 85 further including a cone positioned outside said throat outlet, said cone having a slope with a small end cone inlet opening positioned beneath said surface and a large end cone outlet opening positioned in said container space outside and above said throat outlet.

89. The gas scrubber of claim 81 further including means to continuously recirculate said liquid in said container.

90. A gas scrubber for removing particulate and undesired gases from a gas stream, said scrubber comprising:

a container having a bottom wall and a top wall interconnected by a side wall for containing a liquid having a surface forming a space between said surface and said top wall, said top wall having an opening;

a driving mechanism positioned above said opening having a rotatable shaft extending through said opening;

a rotatable fan positioned in a fan space formed by a stationary upper housing having a centrally positioned fan inlet opening connected to said top wall opening and a rotatable lower housing connected to said shaft to rotate therewith, said lower housing having a lower housing inlet and throat outlet formed along the periphery of said lower housing;

fan blades attached to a top side of said lower housing to rotate therewith in said fan space;

a rotatable siphon pipe positioned below said fan lower housing and connected to said rotatable shaft, said siphon pipe having a siphon inlet disposed below said liquid surface and a siphon outlet, larger then said siphon inlet, connected to said lower housing inlet opening; and a second opening formed through said container for discharging said scrubbed gas from said space exterior of said container.

91. The gas scrubber of claim 90 further including:

a sleeve positioned in said second opening, said sleeve having an outlet disposed outside of said container and a sleeve inlet disposed in said space; and a partition connected inside said sleeve to cause gas flowing through said sleeve inlet to enter said sleeve inlet tangentially causing circular flow of said gas through said sleeve.

92. The gas scrubber of claim 90 further including:

a liquid supply connected to said container; and a level controller connected between said liquid supply and said container for passing liquid from said liquid supply to said container to maintain said liquid surface in said container.

93. The gas scrubber of claim 90 further including a cone positioned outside said throat outlet, said cone having a slope with a small end cone inlet opening positioned beneath said surface and a large end cone outlet opening positioned in said container space outside and above said throat outlet.

94. The gas scrubber of claim 90 wherein tips of said fan blades are provided with grooves to divide said liquid flowing out of said throat into separate streams.

95. The gas scrubber of claim 93 wherein tips of said fan blades are provided with grooves to divide said liquid flowing out of said throat into separate streams.

96. The gas scrubber of claim 90 wherein said throat outlet is provided with restrictions that prevent said gas from flowing out of selected areas of said throat outlet.

97. The gas scrubber of claim 93 wherein said throat outlet is provided with restrictions that prevent said gas from flowing out of selected areas of said throat outlet.

98. The gas scrubber of claim 94 wherein said throat outlet is provided with restrictions that prevent said gas from flowing out of selected areas of said throat outlet.

99. The gas scrubber of claim 95 wherein said throat outlet is provided with restrictions that prevent said gas from flowing out of selected areas of said throat outlet.

100. The gas scrubber of claim 90 further including means to continuously recirculate said liquid in said container.

101. A gas scrubber for removing particulate and undesired gases from a gas stream, said scrubber comprising:

a container having a bottom wall and a top wall interconnected by a side wall for containing a liquid having a surface forming a space between said surface and said top wall, said top wall having an opening;

a driving mechanism positioned above said opening having a rotatable shaft extending through said opening;

a rotatable circular fan positioned in said space and connected to said shaft to rotate therewith having a fan inlet opening positioned proximate said top wall opening and an outlet opening positioned in said space;

a rotatable siphon pipe connected to said shaft and positioned below said fan having a siphon inlet disposed below said liquid surface and a siphon outlet, larger than said siphon inlet, positioned proximate said fan outlet opening;

a rotatable circular throat formed by an upper circular housing and a lower circular housing, said lower circular housing connected to said siphon pipe, said upper circular housing forming a throat inlet functionally connected to said fan outlet and a throat outlet opened to said space for said gas stream to flow from outside said container through said fan and said throat to said space;

fan blades positioned inside said throat;

a cone positioned outside said throat outlet, said cone having a slope with a small end cone inlet opening positioned beneath said surface and a large end cone outlet opening positioned in said container space outside and above said throat outlet; and a second opening formed through said container for discharging said scrubbed gas from said space exterior of said container.

102. A gas scrubber for removing particulate and undesired gases from a gas stream, said scrubber comprising:

a container having a bottom wall and a top wall interconnected by a side wall for containing a liquid having a surface forming a container space between said surface and said top wall, said top wall having a container opening;

a driving mechanism having a rotatable shaft extending down through said container opening;

a fan space defined by an upper circular housing and a lower circular housing positioned within said container space, said upper circular housing having a fan inlet opening positioned proximate said container opening and said lower circular housing forming a lower inlet opening;

a circular outlet throat formed by said upper circular housing and said lower circular housing;

a rotatable circular fan having fan blades positioned in said fan space and connected to said shaft wherein said gas stream flows from outside said container through said container opening, said fan inlet opening into said fan space and through said outlet throat to said container space;

a rotatable siphon pipe positioned below said fan and connected to said rotatable shaft; said siphon pipe having a siphon inlet disposed below said liquid surface and a siphon outlet, larger then said siphon inlet, connected to said lower housing inlet opening, wherein said rotating siphon pipe draws and rotates said liquid through said siphon pipe into said lower housing inlet opening and through said throat, said siphon pipe rotating said liquid in said container causing said rotating liquid to gravitate up said side wall and form an additional liquid surface in front of said throat outlet;

obstructions positioned in said throat proximate a peripheral edge of said throat to restrict flow of said gas through said throat and to provide wetted surfaces for said gas to impact and scrub said gas when said gas is centrifugally forced over said surfaces;

a cone positioned outside said throat outlet, said cone having a slope with a small end cone inlet opening positioned beneath said surface and a large end cone outlet opening positioned in said container space outside and above said throat outlet; and a second opening formed in said top wall for discharging said scrubbed gas from said space to the outside of said container.

103. A gas scrubber for removing particulate and undesired gases from a gas stream, said scrubber comprising:

a container having a bottom wall and a top wall interconnected by a side wall for containing a liquid having a surface forming a container space between said surface and said top wall, said top wall having a container opening;

a driving mechanism having a rotatable shaft extending down through said container opening;

a fan space defined by an upper circular housing and a lower circular housing positioned within said container space, said upper circular housing having a fan inlet opening positioned proximate said container opening and said lower circular housing forming a lower inlet opening;

a circular outlet throat formed by said upper circular housing and said lower circular housing;

a rotatable circular fan having fan blades positioned in said fan space and connected to said shaft wherein said gas stream flows from outside said container through said container opening, said fan inlet opening into said fan space and through said outlet throat to said container space;

a protrusion connected to the bottom of said lower housing to rotate therewith and extending below said surface to rotate said liquid so that said rotating liquid forms an additional surface that gravitates up said side wall and in front of said throat outlet to provide a liquid surface for the gas flowing out of said throat outlet to impact and impinge said particulate and undesired gases to scrub said gas; and a second opening formed in said top wall for discharging said scrubbed gas from said space to the outside of said container.

104. The gas scrubber of claim 103 further including:

a sleeve positioned in said second opening, said sleeve having an outlet disposed outside of said container and a sleeve inlet disposed in said space; and a partition connected inside said sleeve to cause gas flowing through said sleeve inlet to enter said sleeve inlet tangentially causing circular flow of said gas through said sleeve.

105. The gas scrubber of claim 103 further including:

a liquid supply connected to said container; and a level controller connected between said liquid supply and said container for passing liquid from said liquid supply to said container to maintain said liquid surface in said container.

106. The gas scrubber of claim 103 further including a cone positioned outside said throat outlet, said cone having a slope with a small end cone inlet opening positioned beneath said surface and a large end cone outlet opening positioned in said container space outside and above said throat outlet.

107. The gas scrubber of claim 103 further including:

a rotatable exhaust fan back plate attached to an upper outside portion of said upper housing and positioned in said space beneath said second opening to rotate in said space with said fan;

exhaust fan blades attached to a bottom of said back plate; and a partition attached to said side wall and positioned horizontally in said space below said exhaust fan blades, said partition having an exhaust fan inlet opening in the center thereof to said exhaust fan blades in a manner such that rotating said exhaust fan blades draw scrubbed gas from said container space through said exhaust fan inlet opening through said second opening.

108. The gas scrubber of claim 107 further including:

a sump positioned between an outer extremity of said partition and said side wall to collect liquid droplets that coalesce and gravitate down said side wall; and a drain pipe having an inlet opening inside said sump and an outlet opening positioned below said surface.

109. The gas scrubber of claim 103 wherein said throat outlet is provided with restrictions that prevent said gas from flowing out of selected areas of said throat outlet.

110. A gas scrubber for removing particulate and undesired gases from a gas stream, said scrubber comprising:

a container having a bottom wall and a top wall interconnected by a side wall for containing a liquid having a surface forming a space between said surface and said top wall, said top wall having an opening;

a driving mechanism positioned above said opening having a rotatable shaft extending through said opening;

a rotatable fan positioned in a fan space formed by a rotatable upper housing having a centrally positioned fan inlet opening positioned proximate said top wall opening and a rotatable lower housing connected to said shaft to rotate therewith, said lower housing having a lower housing inlet and throat outlet formed along the periphery of said lower housing;

fan blades attached to a top side of said lower housing to rotate therewith in said fan space;

a protrusion connected to the bottom of said lower housing to rotate therewith and extending below said surface to rotate said liquid so that said rotating liquid forms an additional surface that gravitates up said side wall and in front of said throat outlet to provide a liquid surface for the gas flowing out of said throat outlet to impact and impinge said particulate and undesired gases to scrub said gas; and a second opening formed through said container for discharging said scrubbed gas from said space exterior of said container.

111. The gas scrubber of claim 110 further including:

a sleeve positioned in said second opening, said sleeve having an outlet disposed outside of said container and a sleeve inlet disposed in said space; and a partition connected inside said sleeve to cause gas flowing through said sleeve inlet to enter said sleeve inlet tangentially causing circular flow of said gas through said sleeve.

112. The gas scrubber of claim 110 further including:

a liquid supply connected to said container; and a level controller connected between said liquid supply and said container for passing liquid from said liquid supply to said container to maintain said liquid surface in said container.

113. The gas scrubber of claim 110 further including a cone positioned outside said throat outlet, said cone having a slope with a small end cone inlet opening positioned beneath said surface and a large end cone outlet opening positioned in said container space outside and above said throat outlet.

114. The gas scrubber of claim 110 wherein said throat outlet is provided with restrictions that prevent said gas from flowing out of selected areas of said throat outlet.

115. The gas scrubber of claim 111 wherein said throat outlet is provided with restrictions that prevent said gas from flowing out of selected areas of said throat outlet.

116. The gas scrubber of claim 112 wherein said throat outlet is provided with restrictions that prevent said gas from flowing out of selected areas of said throat outlet.

117. The gas scrubber of claim 113 wherein said throat outlet is provided with restrictions that prevent said gas from flowing out of selected areas of said throat outlet.

118. A gas scrubber for removing particulate and undesired gases from a gas stream, said scrubber comprising:

a container having a bottom wall and a top wall interconnected by a side wall for containing a liquid having a surface forming a container space between said surface and said top wall, said top wall having a container opening;

a stationary circular upper and lower housing positioned in said container space forming a housing space therebetween and a circular outlet throat about a periphery of said housings, said upper housing having a centrally positioned inlet opening connected to said container opening and said lower housing having a centrally positioned inlet opening positioned below said surface;

a driving mechanism positioned above said container opening having a rotatable shaft extending through said container opening;

a rotatable circular back plate positioned in said housing space having an inside rim connected to said shaft to rotate therewith and an outside rim positioned proximate said throat;

fan blades attached to a top side of said back plate and positioned below said upper housing to rotate with said back plate to draw said gas from said container opening and to force said gas through said throat to said container space;

impellers attached to a bottom side of said back plate positioned above said lower housing and extending down below said surface; and a second opening formed through said container for discharging scrubbed gas from said space exterior of said container.

119. The gas scrubber of claim 118 further including:

a sleeve positioned in said second opening, said sleeve having an outlet disposed outside of said container and a sleeve inlet disposed in said space; and a partition connected inside said sleeve to cause gas flowing through said sleeve inlet to enter said sleeve inlet tangentially causing circular flow of said gas through said sleeve.

120. The gas scrubber of claim 118 further including:

a liquid supply connected to said container; and a level controller connected between said liquid supply and said container for passing liquid from said liquid supply to said container to maintain said liquid surface in said container.

121. The gas scrubber of claim 119 further including:

a liquid supply connected to said container; and a level controller connected between said liquid supply and said container for passing liquid from said liquid supply to said container to maintain said liquid surface in said container.

122. The gas scrubber of claim 118 further including a cone positioned outside said throat outlet, said cone having a slope with a small end cone inlet opening positioned beneath said surface and a large end cone outlet opening positioned in said container space outside and above said throat outlet.

123. The gas scrubber of claim 119 further including a cone positioned outside said throat outlet, said cone having a slope with a small end cone inlet opening positioned beneath said surface and a large end cone outlet opening positioned in said container space outside and above said throat outlet.

124. The gas scrubber of claim 120 further including a cone positioned outside said throat outlet, said cone having a slope with a small end cone inlet opening positioned beneath said surface and a large end cone outlet opening positioned in said container space outside and above said throat outlet.

125. The gas scrubber of claim 121 further including a cone positioned outside said throat outlet, said cone having a slope with a small end cone inlet opening positioned beneath said surface and a large end cone outlet opening positioned in said container space outside and above said throat outlet.

126. A gas scrubber for removing particulate and selected gases from a gas stream, said scrubber comprising:
  means for containing a liquid having a liquid surface at a selected level defining a container space, said container means forming a top opening;
  a shaft extending into said container means;
  means for rotatably driving said shaft connected thereto;
  a top housing and bottom housing connected to said shaft to form a rotatable centrifugal cylinder, said housings defining a housing space and a throat forming a pathway between said housing space and said container space;
  a gas inlet opening, smaller than said throat, formed through said top housing proximate said top opening allowing flow of a gas through said top opening and said gas inlet opening and said throat;
  a liquid inlet opening, smaller than said throat, formed through said bottom housing below said liquid surface allowing flow of said liquid through said throat to scrub said gas;
  restrictions disposed in said throat in a manner to be wetted and washed by said liquid flowing through said throat and to draw said gas through said throat to wet particulate and absorb larger gas molecules in said gas by centrifugally impacting said wetted restrictions with said particulate and larger gas molecules to scrub said gas; and
  a second top opening formed through said container means for discharging said scrubbed gas from said container space.

127. The gas scrubber of claim 126 further including:
  a sleeve positioned in said second top opening, said sleeve having an outlet disposed outside of said container means and a sleeve inlet disposed in said container space; and
  a partition associated with said sleeve inlet to cause gas flowing through said sleeve inlet to enter said sleeve inlet tangentially causing circular flow of said gas through said sleeve.

128. The gas scrubber of claim 126 wherein said restrictions comprise fan blades.

129. The gas scrubber of claim 128 wherein tips of said fan blades are form grooves to divide said liquid flowing out of said throat into separate streams.

130. The gas scrubber of claim 126 further including:
  a rotatable exhaust fan back plate attached to an outer portion of said top housing and positioned in said container space beneath said second opening to rotate in said container space;
  exhaust fan blades attached to a bottom of said back plate; and
  a partition attached to a side wall of said container means and positioned horizontally in said container space below said exhaust fan blades, said partition having an exhaust fan inlet opening in the center thereof in a manner such that rotating said exhaust fan blades draws scrubbed gas from said container space through said exhaust fan inlet opening through said second opening.

131. The gas scrubber of claim 130 further including:
  a sump positioned between an outer extremity of said partition and said container means to collect liquid droplets that coalesce within said container means; and
  a drain pipe having an inlet opening disposed inside said sump and an outlet opening positioned below said surface.

132. The gas scrubber of claim 126 further including a cone positioned outside said throat, said cone having a small end cone inlet opening positioned beneath said liquid surface and a large end cone outlet opening positioned in said container space outside and above said throat.

133. The gas scrubber of claim 126 further including a siphon pipe connected to said shaft to rotate therewith, said siphon pipe having a pipe inlet opening positioned beneath said liquid surface and a pipe outlet opening, larger than said pipe inlet opening, positioned proximate said top housing gas inlet opening to centrifugally pump additional liquid through said siphon pipe and through said pipe outlet opening against a wall of said top housing wetting and washing said top housing and impacting said wetted wall with particulate and larger molecules in said gas to wet and absorb said particulate and larger gas molecules to further scrub said gas.

134. The gas scrubber of claim 126 wherein said restrictions include:
  circular upper vanes positioned in said throat perpendicularly encircling and extending from said shaft having upper vane top edges attached to said top housing and upper vane bottom edges positioned above said bottom housing defining a bottom summit space between said upper vane bottom edges and said bottom housing, and
  circular lower vanes positioned in said throat perpendicularly encircling and extending from said shaft with lower vane bottom edges attached to said bottom housing and lower vane top edges positioned below said top housing defining a top summit space between said lower vane top edges and said top housing;
  wherein said upper vanes extend into spaces formed between said lower vanes and said lower vanes extending into spaces formed between said upper vanes such that a swerving path is provided through said top and bottom summit spaces and through said spaces between said upper and lower vanes allowing liquid flowing through said throat to wet and wash inside surfaces of said vanes and to flow off the tips of said vanes at a high velocity to mix and scrub said gas and to allow particulate in said gas flowing through said vane spaces to centrifugally be impacted against said wetted vane surfaces.

135. The gas scrubber of claim 126 wherein said restrictions include:
  circular upper ridges diagonally positioned in said throat and connected to said top housing forming upper valley spaces between said upper ridges; and circular lower ridges diagonally positioned in said throat and connected to said bottom housing forming lower valley spaces between said lower ridges;

wherein said upper ridges extend into said lower valley spaces and said lower ridges extend into said upper valley spaces to provide a swerving passageway between said ridges in said throat.

136. A method of scrubbing a gas stream of undesired particulate and selected gases from a stream, said method comprising the steps of:

providing a means for containing a liquid maintained at a selected liquid surface level therein forming a space between said liquid surface and said containing means;

providing a first top opening through said container means;

rotating a top housing and a bottom housing connected to a shaft to form a rotatable centrifugal cylinder, said housings defining a housing space and a throat forming a pathway between said housing space and said container space;

drawing gas from exterior of said containing means through said top opening and through a gas inlet opening, smaller than said throat, formed through said top housing proximate said top opening allowing flow of said gas through said throat;

drawing said liquid through an inlet opening, smaller than said throat, formed through said bottom housing below said liquid surface allowing flow of said liquid through said throat to scrub said gas;

disposing restrictions in said throat in a manner to be wetted and washed by said liquid flowing through said throat and to draw said gas through said throat to wet particulate and absorb larger gas molecules in said gas centrifugally impacting said wetted restrictions with said particulate and larger gas molecules to scrub said gas; and discharging said scrubbed gas from said container space through a second top opening formed through said container.

137. The method of claim 136 wherein said restrictions included:

circular upper vanes positioned in said throat perpendicularly encircling and extending from said shaft having upper vane top edges attached to said top housing and upper vane bottom edges positioned above said bottom housing defining a bottom summit space between said upper vane bottom edges and said bottom housing, and circular lower vanes positioned in said throat perpendicularly encircling and extending from said shaft with lower vane bottom edges attached to said bottom housing and lower vane top edges positioned below said top housing defining a top summit space between said lower vane top edges and said top housing;

wherein said upper vanes extend into spaces formed between said lower vanes and said lower vanes extending into spaces formed between said upper vanes such that a swerving path is provided through said top and bottom summit spaces and through said spaces between said upper and lower vanes allowing liquid flowing through said throat to wet and wash inside surfaces of said vanes and to flow off the tips of said vanes at a high velocity to mix and scrub said gas and to allow particulate in said gas flowing through said vane spaces to centrifugally be impacted against said wetted vane surfaces.

138. The method of claim 136 wherein said restrictions include:

circular upper ridges diagonally positioned in said throat and connected to said top housing forming upper valley spaces between said upper ridges; and circular lower ridges diagonally positioned in said throat and connected to said bottom housing forming lower valley spaces between said lower ridges;

wherein said upper ridges extend into said lower valley spaces and said lower ridges extend into said upper valley spaces to provide a swerving passageway between said ridges in said throat.

139. A gas scrubber for removing particulate and selected gases from a gas stream, said scrubber comprising:

container means for containing a liquid having a liquid surface at a selected level and maintaining a selected space between said surface and the top wall of said container means; said container means having a rotatable shaft vertically mounted through the center of a top wall opening in said container means, and means to rotate said shaft;

a rotatable centrifugal cylinder connected to said shaft to rotate therewith, formed by a top shell and a bottom shell that provides an inside space between said shells with the rims of said shells forming a circular outlet throat, positioned in said selected space, providing a pathway from said inside space through said outlet throat and to said selected space;

said top shell having an inlet gas opening, smaller than said outlet throat, centrally positioned in said top shell proximate said top wall opening that allows the flow of a gas through said top wall opening and said inlet gas opening to said pathway, and said bottom shell having an inlet liquid opening, smaller than said outlet throat, centrally positioned in said bottom shell and positioned below said liquid surface, that allows the flow of said liquid, that is centrifugally drawn by said rotating bottom shell, through said liquid opening to said pathway, to scrub said gas;

restrictions positioned in said throat that are wetted and washed by said liquid flowing through said throat, to centrifugally draw said gas through said pathway and to provide wetted surface areas to wet said particulate and absorb larger gas molecules in said gas by centrifugally impacting said wetted surface areas with said particulate and larger molecules in said gas, to further scrub said gas; and a second opening formed through said top wall of said container means for discharging said scrubbed gas from said selected space to the outside of said container means.

140. The gas scrubber of claim 139 further including:

an overflow pipe positioned in said container means at a selected level and in fluid communication with a second container to transfer excess said liquid from said container means to said second container; and means for returning said liquid from said second container to said container means to maintain a selected liquid surface at a selected level.

141. The gas scrubber of claim 140 further including a filter connected within said overflow pipe to remove particulate.

* * * * *